(12) United States Patent  
Okita

(10) Patent No.: US 8,832,334 B2  
(45) Date of Patent: Sep. 9, 2014

(54) METHOD AND APPARATUS TO MIGRATE EXISTING DATA AMONG STORAGE SYSTEMS BASED ON A TRAFFIC AMOUNT THAT DOES NOT EXCEED A PRESET THRESHOLD

(75) Inventor: Hideki Okita, Sunnyvale, CA (US)

(73) Assignee: Hitachi, Ltd., Tokyo (JP)

( * ) Notice: Subject to any disclaimer, the term of this patent is extended or adjusted under 35 U.S.C. 154(b) by 114 days.

(21) Appl. No.: 13/570,740

(22) Filed: Aug. 9, 2012

(65) Prior Publication Data

US 2014/0047139 A1 Feb. 13, 2014

(51) Int. Cl.  
*G06F 3/00* (2006.01)

(52) U.S. Cl.  
USPC .................................. 710/38; 710/36; 710/37

(58) Field of Classification Search  
USPC ...................................................... 710/36–38  
See application file for complete search history.

(56) References Cited

U.S. PATENT DOCUMENTS

| | | | |
|---|---|---|---|
| 7,620,710 B2 * | 11/2009 | Kottomtharayil et al. ..... | 709/223 |
| 8,250,256 B2 * | 8/2012 | Ghosalkar et al. ............. | 710/38 |
| 8,255,596 B2 * | 8/2012 | Kull et al. ...................... | 710/38 |
| 8,380,958 B2 * | 2/2013 | Lau et al. ....................... | 711/165 |
| 8,392,753 B1 * | 3/2013 | Don et al. ....................... | 714/6.3 |
| 2010/0318692 A1 | 12/2010 | Koll et al. | |

* cited by examiner

*Primary Examiner* — Tammara Peyton  
(74) *Attorney, Agent, or Firm* — Mattingly & Malur, PC

(57) ABSTRACT

According to an aspect of the invention, a computer comprises a memory; and a processor operable to manage a plurality of path groups, each of which includes a plurality of logical paths associated with a host computer, wherein each logical path of the plurality of logical paths connects the host computer to a logical volume of one or more logical volumes in one or more storage systems. The processor is operable to manage a priority of each path group of the plurality of path groups, and to use a logical path of a first path group instead of a logical path of a second path group for I/O (input/output) usage between the host computer and the one or more storage systems, representing a migration of I/O usage from the second path group to the first path group, based on at least the priorities of the first and second path groups.

20 Claims, 34 Drawing Sheets

Storage device information

| DKC ID | Name | Vendor | Model | |
|--------|------|--------|-------|---|
| str0 | STR-FC-0 | VENDOR-A | MODEL-A | ~408 ~501 |
| str1 | STR-ISCSI-0 | VENDOR-B | MODEL-B | ~502 |
| | | | | |

Fig. 5

Storage controller information

| DKC ID | Controller ID | Type |
|--------|---------------|------|
| str0 | fcctl0 | TYPE_FC |
| str1 | iscsictl0 | TYPE_ISCSI |
| | | |

Fig. 6

Volume information

| DKC ID | Volume ID | |
|--------|-----------|---|
| str0 | vol0 | 701 |
| str0 | vol1 | 702 |
| str1 | vol2 | 703 |
| | | |

Logical unit information

| DKC ID | CTL ID | Volume ID | LUN | Adaptor Type | Adaptor ID |
|---|---|---|---|---|---|
| str0 | fcctl0 | vol0 | 1 | TYPE_WWN | wwn1 |
| str0 | fcctl0 | vol1 | 2 | TYPE_WWN | wwn2 |
| str1 | iscsictl0 | vol2 | 1 | TYPE_IQN | Iqn1 |
|  |  |  |  |  |  |

Fig. 8

Zoning configuration information

| Node | Port | Zoning |
|------|------|--------|
| fcsw0 | 0 | zone0 | ~412 / ~901
| fcsw0 | 0 | zone1 | ~902
| fcsw0 | 1 | zone0 | ~903
| fcsw0 | 1 | zone1 | ~904
|  |  |  |

Fig. 9

VLAN configuration information

| Node | Port | VLAN | |
|------|------|------|------|
| sw0 | 1/0 | 1001 | 1001 |
| sw0 | 1/1 | 1001 | 1002 |
| sw0 | 1/1 | 3001 | 1003 |
| sw0 | 1/2 | 3001 | 1004 |
| sw1 | 1/0 | 1001 | 1005 |
| sw1 | 1/0 | 3001 | 1006 |
| sw1 | 1/1 | 1001 | 1007 |
| sw1 | 1/1 | 3001 | 1008 |
| sw2 | 1/0 | 3001 | 1009 |
| sw2 | 1/1 | 3001 | 1010 |
| | | | |

Path group information

| Path group ID | Priority | Threshold | |
|---|---|---|---|
| fc0 | 100 | 80% | ~414 ~1101 |
| iscsi0 | 50 | 50% | ~1102 |
| | | | |

Fig. 11

Path information

| Path ID | Path group ID | Type | DKC ID | Volume ID | Controller ID | Host ID | Adaptor ID |
|---|---|---|---|---|---|---|---|
| path0 | fc0 | TYPE_FC | str0 | vol0 | fcctl0 | host0 | hba0 |
| path1 | fc0 | TYPE_FC | str0 | vol1 | fcctl0 | host0 | hba0 |
|  |  |  |  |  |  |  |  |

Fig. 12

Path traffic performance information

| Path ID | Incoming traffic | Outgoing traffic |
|---------|------------------|------------------|
| path0   | 2.4 Gbps         | 5.1 Gbps         |
| path1   | 0.8 Gbps         | 1.7 Gbps         |
|         |                  |                  |

Link traffic performance information

| Node | Port | Node | Port | Forward traffic | Backward traffic |
|---|---|---|---|---|---|
| host0 | hba0 | fcsw0 | 0 | 3.2 Gbps | 6.8 Gbps |
| fcsw0 | 1 | ss0 | fcctl0 | 3.2 Gbps | 6.8 Gbps |
| | | | | | |

Migrated path information

| Path ID | Host | Current path group | Current volume | New path group | New volume |
|---|---|---|---|---|---|
| path0 | host0 | fc0 | vol0 | iscsi0 | vol2 |
|  |  |  |  |  |  |

Fig. 15

Path information

| Path ID | Path group ID | Type | DKC ID | Volume ID | Controller ID | Host ID | Adaptor ID | |
|---|---|---|---|---|---|---|---|---|
| path0 | fc0 | TYPE_FC | str0 | vol0 | fcctl0 | host0 | hba0 | ~2301 |
| path1 | fc0 | TYPE_FC | str0 | vol0 | fcctl1 | host0 | hba1 | ~2302 |
| path2 | fc0 | TYPE_FC | str0 | vol1 | fcctl0 | host0 | hba0 | ~2303 |
| path3 | fc0 | TYPE_FC | str0 | vol1 | fcctl1 | host0 | hba1 | ~2304 |
| | | | | | | | | |

Fig. 23

Redundant path information

| Path ID | Redundant path | |
|---------|----------------|------|
| path0 | path1 | ～2401 |
| path1 | path0 | ～2402 |
| path2 | path3 | ～2403 |
| path3 | path2 | ～2404 |
| | | |

FCoE configuration information

| Switch | Preference Group ID | Bandwidth % | Application | |
|---|---|---|---|---|
| fcoesw0 | 0 | 40 | SAN | ～3001 |
| fcoesw0 | 1 | 60 | LAN | ～3002 |
| fcoesw1 | 0 | 40 | SAN | ～3003 |
| fcoesw1 | 1 | 60 | LAN | ～3004 |
| fcoesw2 | 0 | 40 | SAN | ～3005 |
| fcoesw2 | 1 | 60 | LAN | ～3006 |
| | | | | |

Fig. 30

METHOD AND APPARATUS TO MIGRATE EXISTING DATA AMONG STORAGE SYSTEMS BASED ON A TRAFFIC AMOUNT THAT DOES NOT EXCEED A PRESET THRESHOLD

BACKGROUND OF THE INVENTION

The present invention relates generally to Storage Area Network (SAN) storage systems and, more particularly, to a method and an apparatus to migrate existing data among multiple SAN storage devices.

In recent years, the SAN storage system has been utilized to store data that are mission-critical to businesses. Host computers using the data are connected to the SAN storage systems via Fibre Channel (FC) switches. They also utilize the Fibre Channel (FC) protocol to encapsulate SCSI commands to FC frames so that they can access multiple devices connected to a SAN.

To improve the extensibility of the SAN storage system, a distributed SAN storage system extends the architecture of the SAN storage system. Such an extended SAN storage system has multiple storage devices connected to a host via an FC-SAN. The storage system migrates a data volume on a storage device to other storage devices, and switches over an I/O path for the host between those multiple storage devices. When the load of a storage system increases, the system enables to extend the whole capacity of the storage system by load-balancing for multiple volumes between multiple storage devices without replacing the storage device with one of large capacity. However, when a large number of I/O paths are configured on a SAN for the above distributed SAN storage system, there is a problem that the I/O paths reach the performance capacity of the SAN. For example, the bandwidth of a link in the SAN is used up by the multiple I/O paths for the multiple storage devices. It causes a performance decrease of I/O access. Also, the I/O paths reach the operational capacity of the SAN. For example, the number of zoning configurations for the I/O paths reaches the maximum number of zones available in the SAN. It requires re-construction of the zoning configuration and increases operational load.

In the distributed SAN storage system, when the operator extends its capacity by migrating existing volumes between multiple storage devices and by load balancing, I/O paths may reach the performance capacity and operational capacity that cause performance degradation and operational load, respectively.

U.S. Patent Application Publication No. 2010/0318692 discloses how to migrate existing data between storage systems connected to a SAN. The target storage controller is configured with at least one target volume having path-through support to a source volume of the source storage controller. An I/O path to the existing data through the target storage controller is configured. The I/O path is added to an existing I/O path connected to the existing data using an OS operational on at least one host in communication between the source and target storage controllers. The OS is adapted for I/O multipath support. After data migration, the existing I/O path is removed.

BRIEF SUMMARY OF THE INVENTION

Exemplary embodiments of the invention provide a technique to prevent performance degradation and operational load of a SAN that has a capability of volume migration between multiple storage devices. As opposed to US2010/0318692, the present invention provides capacity management of a SAN by defining tiers of I/O paths migrating paths among the tiers. The storage system of the present invention manages path-group information, which is a set of groups of I/O paths between hosts and storage volumes with their priorities. Then it determines storage volumes that cause excess traffic for each path-group. It also assigns a new I/O path for each determined volume with a block-storage access protocol of a path-group that has lower priority than that of the path-group of the existing volume.

In short, the present invention provides a storage management system that manages a set of path-groups each of which is composed of multiple paths with similar performance capability and manages threshold of traffic amount of each path-group. When the traffic amount of a path-group exceeds the threshold, the storage management system determines and migrates I/O paths to a lower-prioritized path-group so that the traffic amount of the higher-prioritized path-group drops below the threshold. Heretofore, there is no method for keeping the traffic amount within the storage network capacity without increased operational load of path configuration.

The first embodiment of the present invention is a storage management system that manages migration of Fibre-Channel (FC) I/O paths of low priorities in a path-group including only the FC paths to iSCSI (Internet Small Computer System Interface) I/O paths in a path-group including only the iSCSI paths. For this objective, the storage management system manages source hosts and destination storage volumes of the FC paths and iSCSI paths. When the amount of traffic in an FC-SAN increases and exceeds the threshold, the storage management system migrates the FC paths to iSCSI paths in a LAN until the amount of FC-SAN traffic is below the threshold.

The second embodiment of the present invention (migration of multiple redundant paths) is a storage management system that manages migration of FC paths each of which has its redundant path and forms a multipath. The storage management system manages the redundancy between multiple FC paths and redundancy between multiple iSCSI paths.

The third embodiment of the present invention (migration from an FCoE (Fibre Channel over Ethernet) path to an iSCSI path in an FCoE-SAN) is a storage management system that manages migration of FCoE paths in an FCoE network to iSCSI paths in the same FCoE network. The storage management system manages the amount of bandwidth for each of FCoE traffic and other traffic in the FCoE network, and replaces the FCoE path by an iSCSI path created by a VLAN.

The fourth embodiment of the present invention is a storage management system that manages migration of FCoE paths in an FCoE network to iSCSI paths in the same FCoE network. The FCoE logical paths and the iSCSI logical paths are multiplexed on the FCoE network having FCoE switches, along a set of FCoE links from the host computer via the FCoE switches to an FCoE storage system. The migration from FCoE paths to iSCSI paths does not change the set of FCoE links.

In accordance with an aspect of the present invention, a computer comprises a memory; and a processor being operable to manage a plurality of path groups, each of which includes a plurality of logical paths associated with a host computer, wherein each logical path of the plurality of logical paths connects the host computer to a logical volume of one or more logical volumes in one or more storage systems. The processor is operable to manage a priority of each path group of the plurality of path groups, and to use a logical path of a first path group instead of a logical path of a second path group for I/O (input/output) usage between the host computer and the one or more storage systems, representing a migration of I/O usage from the second path group to the first path group, based on at least the priorities of the first and second path groups.

In some embodiments, the processor is operable to migrate I/O usage between two path groups of the plurality of path groups, based on information of usage of at least one logical path in each of the two path groups, priorities of the two path groups, and performance of at least one logical path in each of the two path groups. The logical paths in any one path group are of a same type on a path group basis. Each path group has a preset threshold; and the processor is operable, when a traffic amount of one path group exceeds the preset threshold for the one path group, to migrate I/O usage from one or more logical paths in the one path group to one or more logical paths in another path group, which has a lower priority than the one path group and which has a traffic amount that does not exceed the preset threshold for said another path group.

In specific embodiments, the second path group has only Fibre Channel (FC) logical paths and the first path group has only Internet Small Computer System Interface (iSCSI) logical paths. The second path group has only Fibre Channel (FC) logical paths with redundancy and the first path group has only Internet Small Computer System Interface (iSCSI) logical paths with redundancy; and the processor is operable, after the migration of I/O usage from the second path group to the first path group, to preserve redundancy of the iSCSI logical paths in the first path group and to preserve redundancy of the FC logical paths in the second path group.

In specific embodiments, the second path group has only Fibre Channel over Ethernet (FCoE) logical paths in an FCoE network and the first path group has only Internet Small Computer System Interface (iSCSI) logical paths in the same FCoE network. I/O logical paths, including the FCoE logical paths and the iSCSI logical paths, between the host computer and an FCoE storage system are multiplexed on the FCoE network having FCoE switches, along a set of FCoE links from the host computer via the FCoE switches to the FCoE storage system; and the migration of I/O usage from the second path group to the first path group does not change the set of FCoE links from the host computer via the FCoE switches to the FCoE storage system used for the I/O logical paths.

In accordance with another aspect of the invention, a system comprises one or more storage systems; and a computer including a memory and a processor. The processor is operable to manage a plurality of path groups, each of which includes a plurality of logical paths associated with a host computer, wherein each logical path of the plurality of logical paths connects the host computer to a logical volume of one or more logical volumes in the one or more storage systems. The processor is operable to manage a priority of each path group of the plurality of path groups, and to use a logical path of a first path group instead of a logical path of a second path group for I/O (input/output) usage between the host computer and the one or more storage systems, representing a migration of I/O usage from the second path group to the first path group, based on at least the priorities of the first and second path groups.

In some embodiments, the one or more storage systems include a Fibre Channel (FC) storage system and an Internet Small Computer System Interface (iSCSI) storage system. The system further comprises: the host computer; at least one FC switch coupled between the host computer and the FC storage system; a local area network (LAN) coupled to the computer; and a plurality of Layer 2 (L2) switches coupled between the LAN, the host computer, and the iSCSI storage system to configure a Virtual LAN (VLAN). The second path group has only FC logical paths between the host computer and the FC storage system and the first path group has only iSCSI logical paths between the host computer and the iSCSI storage system. The processor is operable to migrate a volume, which is associated with the migration of I/O usage from the second path group to the first path group, from the FC storage system to the iSCSI storage system.

In specific embodiments, the one or more storage systems include a Fibre Channel over Ethernet (FCoE) storage system and an Internet Small Computer System Interface (iSCSI) storage system. The system further comprises: the host computer; a local area network (LAN) coupled to the computer; and a plurality of FCoE switches coupled between the LAN, the host computer, the FCoE storage system and the iSCSI storage system to provide an FCoE network. The second path group has only FCoE logical paths between the host computer and the FCoE storage system and the first path group has only iSCSI logical paths between the host computer and the iSCSI storage system, the FCoE logical paths and the iSCSI logical paths being multiplexed on the FCoE network. The processor is operable to migrate a volume, which is associated with the migration of I/O usage from the second path group to the first path group, from the FCoE storage system to the iSCSI storage system.

In some embodiments, the one or more storage systems include a Fibre Channel over Ethernet (FCoE) storage system. The system further comprises: the host computer; a local area network (LAN) coupled to the computer; and a plurality of FCoE switches coupled between the LAN, the host computer, and the FCoE storage system to provide an FCoE network. The second path group has only FCoE logical paths between the host computer and the FCoE storage system and the first path group has only iSCSI logical paths between the host computer and the FCoE storage system, the FCoE logical paths and the iSCSI logical paths being multiplexed on the FCoE network along a set of FCoE links from the host computer via the FCoE switches to the FCoE storage system. The migration of I/O usage from the second path group to the first path group does not change the set of FCoE links from the host computer via the FCoE switches to the FCoE storage system used for the FCoE and iSCSI logical paths.

Another aspect of this invention is directed to a computer-readable storage medium storing a plurality of instructions for controlling a data processor to manage I/O (input/output) usage. The plurality of instructions comprise: instructions that cause the data processor to manage a plurality of path groups, each of which includes a plurality of logical paths associated with a host computer, wherein each logical path of the plurality of logical paths connects the host computer to a logical volume of one or more logical volumes in one or more storage systems; instructions that cause the data processor to manage a priority of each path group of the plurality of path groups; and instructions that cause the data processor to use a logical path of a first path group instead of a logical path of a second path group for I/O usage between the host computer and the one or more storage systems, representing a migration of I/O usage from the second path group to the first path group, based on at least the priorities of the first and second path groups.

These and other features and advantages of the present invention will become apparent to those of ordinary skill in the art in view of the following detailed description of the specific embodiments.

BRIEF DESCRIPTION OF THE DRAWINGS

FIG. 5 shows an example of the storage device information.

FIG. 6 shows an example of the storage controller information.

FIG. 7 shows an example of the volume information.

FIG. 8 shows an example of the LU information.

FIG. 9 shows an example of the zoning configuration information.

FIG. 10 shows an example of the VLAN configuration information.

FIG. 11 shows an example of the path group information.

FIG. 12 shows an example of the path information according to the first embodiment.

FIG. 13 shows an example of the path traffic performance information.

FIG. 14 shows an example of the link traffic performance information.

FIG. 15 shows an example of the migrated path information.

FIG. 23 shows an example of the path information according to the second embodiment.

FIG. 24 shows an example of the redundant path information.

FIG. 30 shows an example of the FCoE network configuration information.

DETAILED DESCRIPTION OF THE INVENTION

Figure 1:
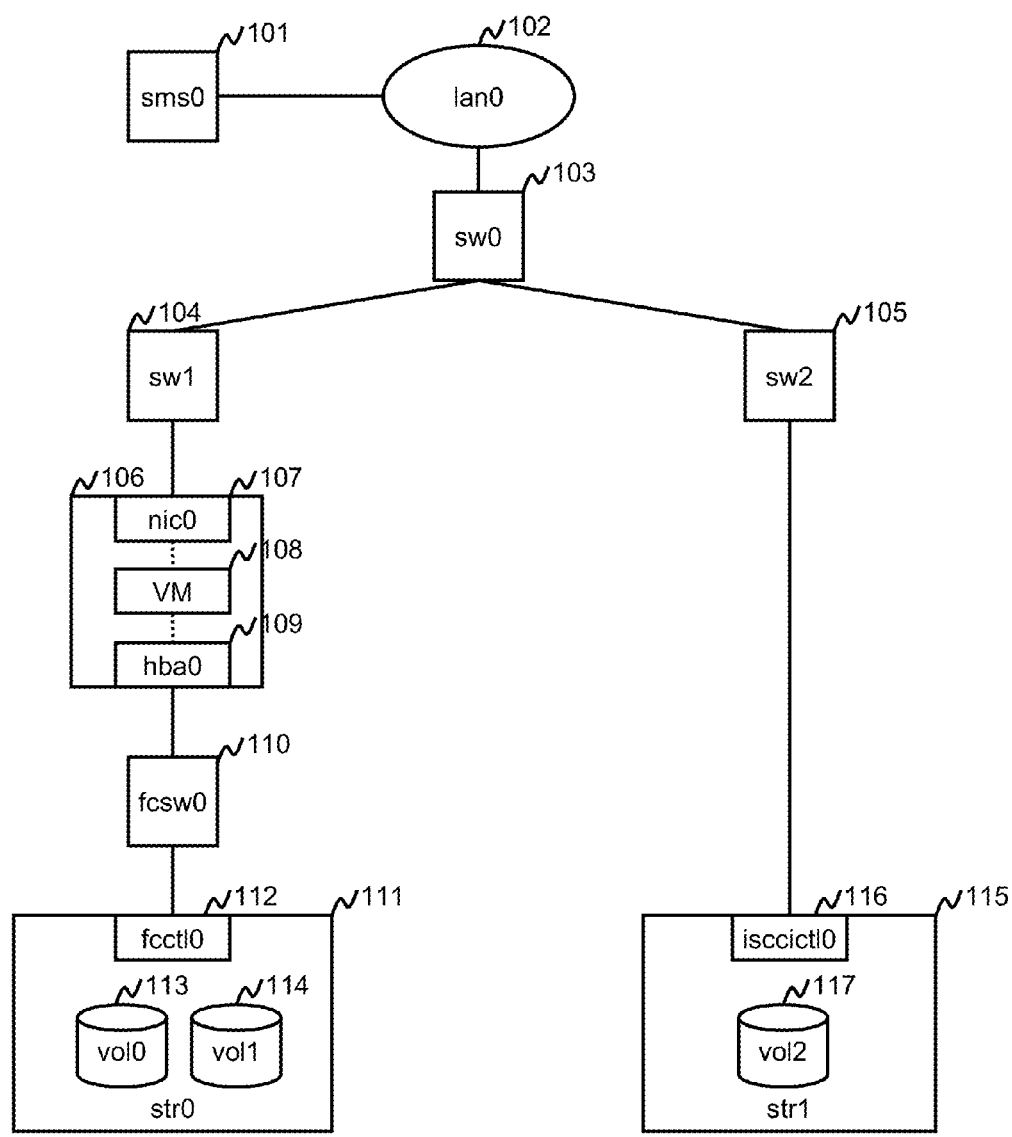
FIG. 1 illustrates an example of a network system in which the method and apparatus of the invention may be applied according to a first embodiment.

In the following detailed description of the invention, reference is made to the accompanying drawings which form a part of the disclosure, and in which are shown by way of illustration, and not of limitation, exemplary embodiments by which the invention may be practiced. In the drawings, like numerals describe substantially similar components throughout the several views. Further, it should be noted that while the detailed description provides various exemplary embodiments, as described below and as illustrated in the drawings, the present invention is not limited to the embodiments described and illustrated herein, but can extend to other embodiments, as would be known or as would become known to those skilled in the art. Reference in the specification to "one embodiment," "this embodiment," or "these embodiments" means that a particular feature, structure, or characteristic described in connection with the embodiment is included in at least one embodiment of the invention, and the appearances of these phrases in various places in the specification are not necessarily all referring to the same embodiment. Additionally, in the following detailed description, numerous specific details are set forth in order to provide a thorough understanding of the present invention. However, it will be apparent to one of ordinary skill in the art that these specific details may not all be needed to practice the present invention. In other circumstances, well-known structures, materials, circuits, processes and interfaces have not been described in detail, and/or may be illustrated in block diagram form, so as to not unnecessarily obscure the present invention.

Furthermore, some portions of the detailed description that follow are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the present invention, the steps carried out require physical manipulations of tangible quantities for achieving a tangible result. Usually, though not necessarily, these quantities take the form of electrical or magnetic signals or instructions capable of being stored, transferred, combined, compared, and otherwise manipulated. It has proven convenient at times, principally for reasons of common usage, to refer to these signals as bits, values, elements, symbols, characters, terms, numbers, instructions, or the like. It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

The present invention also relates to an apparatus for performing the operations herein. This apparatus may be specially constructed for the required purposes, or it may include one or more general-purpose computers selectively activated or reconfigured by one or more computer programs. Such computer programs may be stored in a computer-readable storage medium including non-transient medium, such as, but not limited to optical disks, magnetic disks, read-only memories, random access memories, solid state devices and drives, or any other types of media suitable for storing electronic information. The algorithms and displays presented herein are not inherently related to any particular computer or other apparatus. Various general-purpose systems may be used with programs and modules in accordance with the teachings herein, or it may prove convenient to construct a more specialized apparatus to perform desired method steps. In addition, the present invention is not described with reference to any particular programming language. It will be appreciated that a variety of programming languages may be used to implement the teachings of the invention as described herein. The instructions of the programming language(s) may be executed by one or more processing devices, e.g., central processing units (CPUs), processors, or controllers.

Exemplary embodiments of the invention, as will be described in greater detail below, provide apparatuses, methods and computer programs for migrating existing data among multiple SAN storage devices.

First Embodiment

FIG. 1 illustrates an example of a network system in which the method and apparatus of the invention may be applied according to a first embodiment. In FIG. 1, the network system includes a storage management system 101, a Local Area Network (LAN) 102 connected with the storage management system 101, three L2 (Layer 2) switches 103-105 (the switch 103 is connected with the LAN 102 and the two other switches 104 and 105), a host 106 connected with the switch 104, an FC switch 110 connected with the host 106, an FC storage device 111 connected with the FC switch 110, and an iSCSI storage device 115 connected with the switch 105. The host 106 includes a Network Interface Card (NIC) 107, a VM 108, and a Host Bus Adapter (HBA) 109. The FC storage device 111 includes an FC-capable controller 112 and volumes 113, 114. The iSCSI storage device 115 includes an iSCSI-capable controller 116 and a volume 117.

Figure 2:
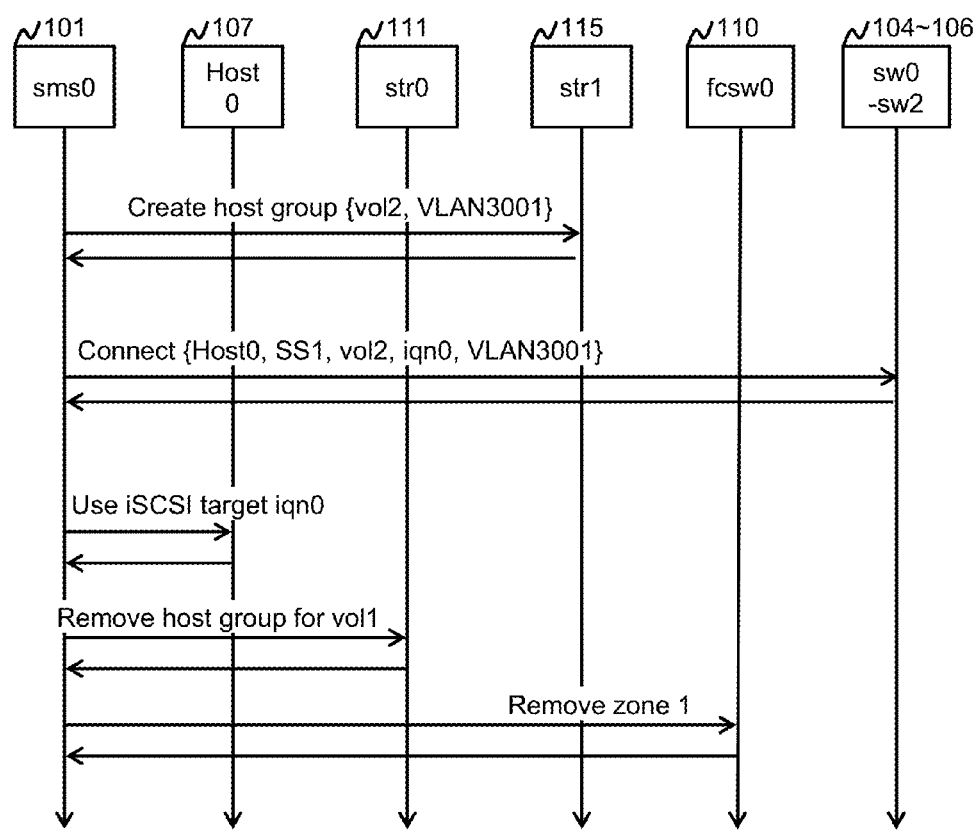
FIG. 2 shows an example of a message sequence among components in the network of FIG. 1 at migration of a volume from the FC storage device to the iSCSI storage device with migration of I/O usage of an FC I/O path to an iSCSI I/O path.

FIG. 2 shows an example of a message sequence among components in the network of FIG. 1 at migration of a volume from the FC storage device 111 to the iSCSI storage device 115 with migration of I/O usage of an FC I/O path to an iSCSI I/O path. In this example, after the storage management system 101 determines which volumes and paths are migrated, it sends a message to the iSCSI storage device 115 to request to connect a volume 117 on the iSCSI storage device 115 to the host 106. Also, it sends messages to L2 switches 103-105 to configure a Virtual LAN (VLAN) to form a transport connection between the host 106 and the iSCSI storage device 115. The storage management system 101 then requests the host 106 to switch over a storage access of a virtual machine (VM) 108 from the FC I/O path to the iSCSI I/O path by designating an iSCSI Qualified Name (IQN) of the volume 117. After the switching over, it sends a request to the FC storage device 111 to remove connectivity configurations called "host group" for the volume 114. It also sends a request to the FC switch 110 to remove configurations of zoning for the volume 114.

Figure 3:
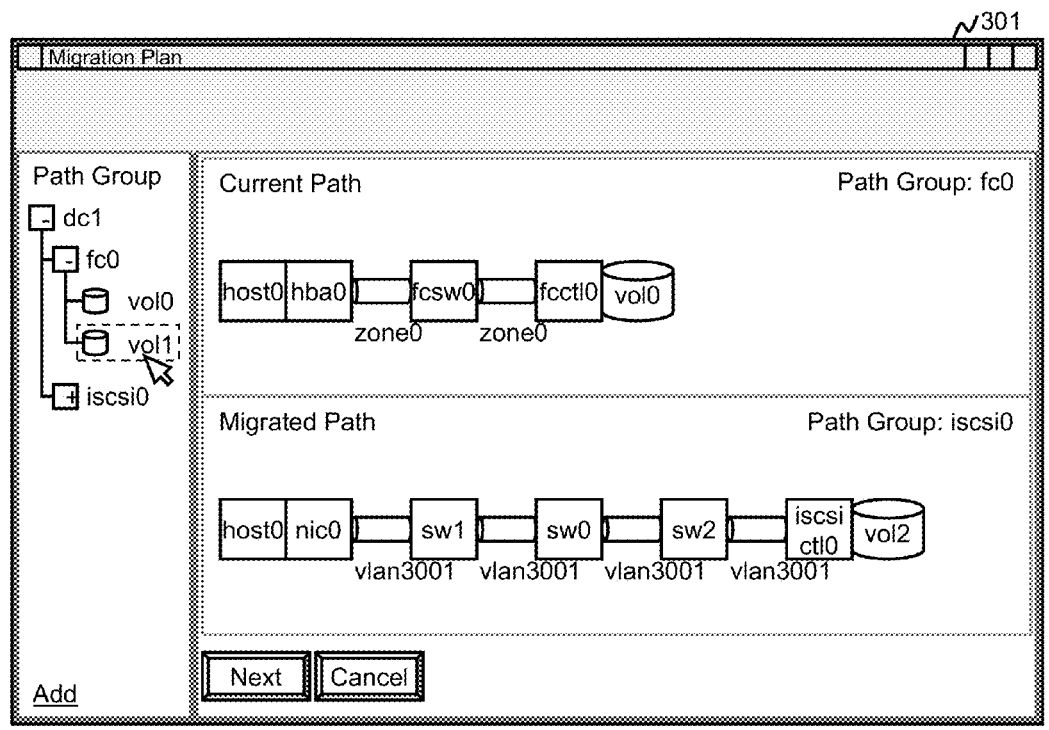
FIG. 3 shows an example of a screen shot of the storage management system.

FIG. 3 shows an example of a screen shot of the storage management system 101. It works as user interface to check a result of migration process that the storage management system 101 determines. In this example, FIG. 3 shows managed path-groups with each corresponding volumes in the left side pane, configuration of a current path in the upper-right pane, and configuration of a migrated path in the lower-right pane. It means that a path between the host 106 and the FC volume 114 is migrated to an iSCSI path formed by a VLAN 3001 between the host 106 and the iSCSI volume 117.

Figure 4:
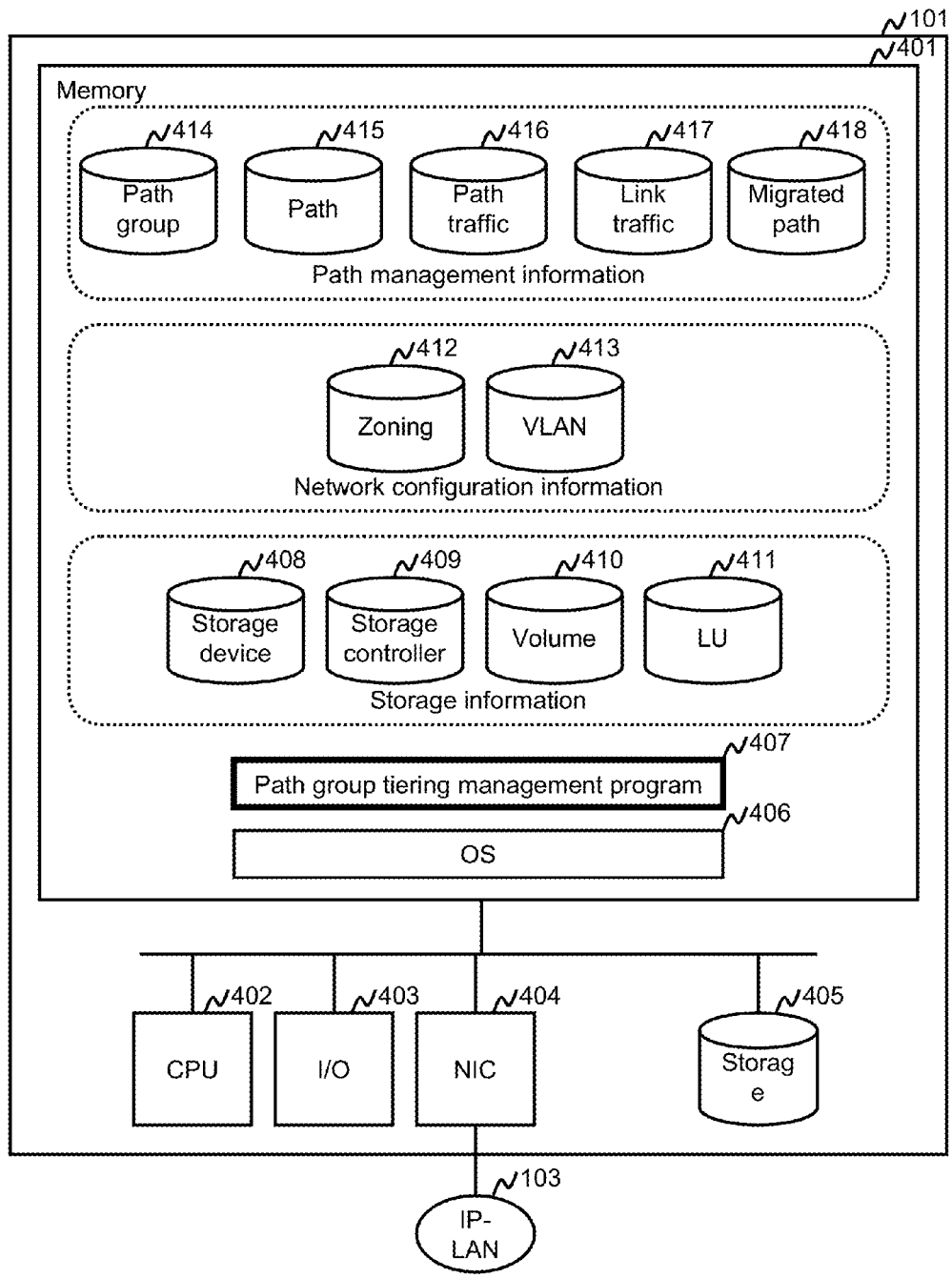
FIG. 4 shows an example of hardware architecture and software architecture of the storage management system according to the first embodiment of the invention.

FIG. 4 shows an example of hardware architecture and software architecture of the storage management system 101 according to the first embodiment of the invention. It has memory 401, CPU 402, I/O 403, Network Interface Card (NIC) 404, and storage 405. On the memory 401, it executes an operating system (OS) 406 and a path-group tiering management program 407. It also stores three types of management information: storage information, network configuration information, and path management information. The storage information includes storage device information 408, storage controller information 409, volume information 410, and logical-unit (LU) information 411. The network configuration information includes zoning information 412 and VLAN configuration information 413. The path management information includes path-group information 414, path information 415, path traffic performance information 416, link traffic performance information 417, and migrated path information 418. The path-group tiering management program 407 utilizes these types of information to manage migration among multiple types of I/O paths.

FIG. 5 shows an example of the storage device information 408. It lists managed storage devices (identified by DKC IDs) and manages their attributes such as their name, vendor information, and product model information. FIG. 5 shows two rows 501, 502 of information for storage devices with DKC IDs of str0 and str1, which are the FC storage device 111 and the iSCSI storage device 115, respectively.

FIG. 6 shows an example of the storage controller information 409. It lists managed storage controllers (identified by Controller IDs) and manages their attributes such as controller types and corresponding DKC IDs of the storage devices on which the storage controllers are installed. FIG. 6 shows two rows 601, 602 of information for storage controllers of storage devices with DKC IDs of str0 and str1.

FIG. 7 shows an example of the volume information 410. It lists managed storage volumes (identified by Volume IDs) created on the storage devices and manages on which storage device the volume is created. FIG. 7 shows three rows 701, 702, 703 of information for two volumes on the FC storage device 111 and one volume on the iSCSI storage device 115, respectively.

FIG. 8 shows an example of the LU information 411. It lists managed LUs (LUN) configured on the storage devices (DKC ID) and manages to which volumes (Volume ID) and controllers (CTL ID) the LUs are assigned. It also manages types and IDs of adaptors (Adaptor Type and Adaptor ID)

used to access the LUs. In this example, the adaptor types are World Wide Names (WWNs) and iSCSI Qualified Names (IQNs). FIG. 8 shows three rows 801, 802, 803 of information for two volumes on the FC storage device 111 and one volume on the iSCSI storage device 115, respectively.

FIG. 9 shows an example of the zoning configuration information 412. Each entry represents a zoning configuration (Zoning) for a port (Port) of an FC switch (Node). In this example, as seen in rows 901-904, two zones identified as "zone0" and "zone1" are configured on the FC switch 110. These two zones are multiplexed on the same ports.

FIG. 10 shows an example of the VLAN configuration information 413. Each entry represents a VLAN configuration (VLAN) for a port (Port) of a layer-2 switch (Node). In this example, as seen in rows 1001-1010, two VLANs identified as "VLAN1001" and "VLAN3001" are configured on layer-2 switches "sw0," "sw1," and "sw2". The "VLAN1001" is configured so as to make connectivity between a port of "sw0" and a port of "sw1." Also, "VLAN3001" is configured so as to make connectivity between a port of "sw1" and a port of "sw2."

FIG. 11 shows an example of the path group information 414. It lists path-groups defined in the managed network. Each path group has its own identifier (Path Group ID), priority, and bandwidth threshold of the amount of traffic. In this example, as seen in rows 1101 and 1102, two path-groups named "fc0" and "iscsi0" are defined. They correspond to a set of FC I/O paths and iSCSI I/O paths, respectively. The priorities of path-groups are utilized for determining the direction of path migration. In this example, it means that paths are migrated from higher-prioritized FC I/O paths (priority: 100) to lower-prioritized iSCSI paths (priority: 50). A higher priority for a path group means I/O for that path group will have priority over I/O for another path group having a lower priority. Also, the thresholds are utilized to determine the timing of path migration. When the amount of I/O for a path group reaches its threshold, the storage management system 101 retrieves the path groups available to migrate I/O for the former path group.

FIG. 12 shows an example of the path information 415 according to the first embodiment. It lists managed I/O paths in the network. Each entry represents a path and includes a path ID which identifies the path, a path group ID that represents the path-group to which the path belongs, and a type information which represents the path type such as FC, FCoE, and iSCSI. Also, the entry includes the information about two endpoints of the path: a volume and a host adaptor. The volume is identified by a set of a DKC ID, a volume ID, and a controller ID. The host adaptor is identified by a set of a host ID and an adaptor ID. FIG. 12 shows two rows or entries 1201, 1202.

FIG. 13 shows an example of the path traffic performance information 416. Each entry is composed of a path ID, the amount of incoming traffic to the volume of the path identified by the above path ID, and the amount of outgoing traffic from the volume of the path identified by the above path ID. These values represent usage of paths and are utilized by the path group tiering management program 407 for determining which paths are to be migrated from a current path-group to a lower-prioritized path-group. FIG. 13 shows two rows 1301, 1302 for path IDs path0 and path1.

FIG. 14 shows an example of the link traffic performance information 417. Each entry is composed of identifiers of two ports of two adjacent network nodes (Node, Port, Node, Port), the amount of traffic directed from the first node to the second node (Forward Traffic), and the amount of traffic with opposite direction (Backward Traffic). Each of the above identifiers is composed of a node ID and a port ID. FIG. 14 shows two rows 1401, 1402 of information. This information on performance of paths is utilized by the path-group tiering management program 407 for determining whether the amount of traffic in a path-group is below its threshold when it migrates I/O usage of the selected paths to a lower-prioritized path-group.

FIG. 15 shows an example of the migrated path information 418. Each entry represents planned migration of an I/O path from a higher-prioritized path-group to a lower-prioritized path-group. It is composed of a path ID, a host ID, a path-group ID of the current path-group to which the path belongs, a current volume ID, a path-group ID of the new path-group to which the path will be migrated, and a new volume ID. This information is utilized by the path-group tiering management program 407 to store temporally the result of path selection.

Figure 16:
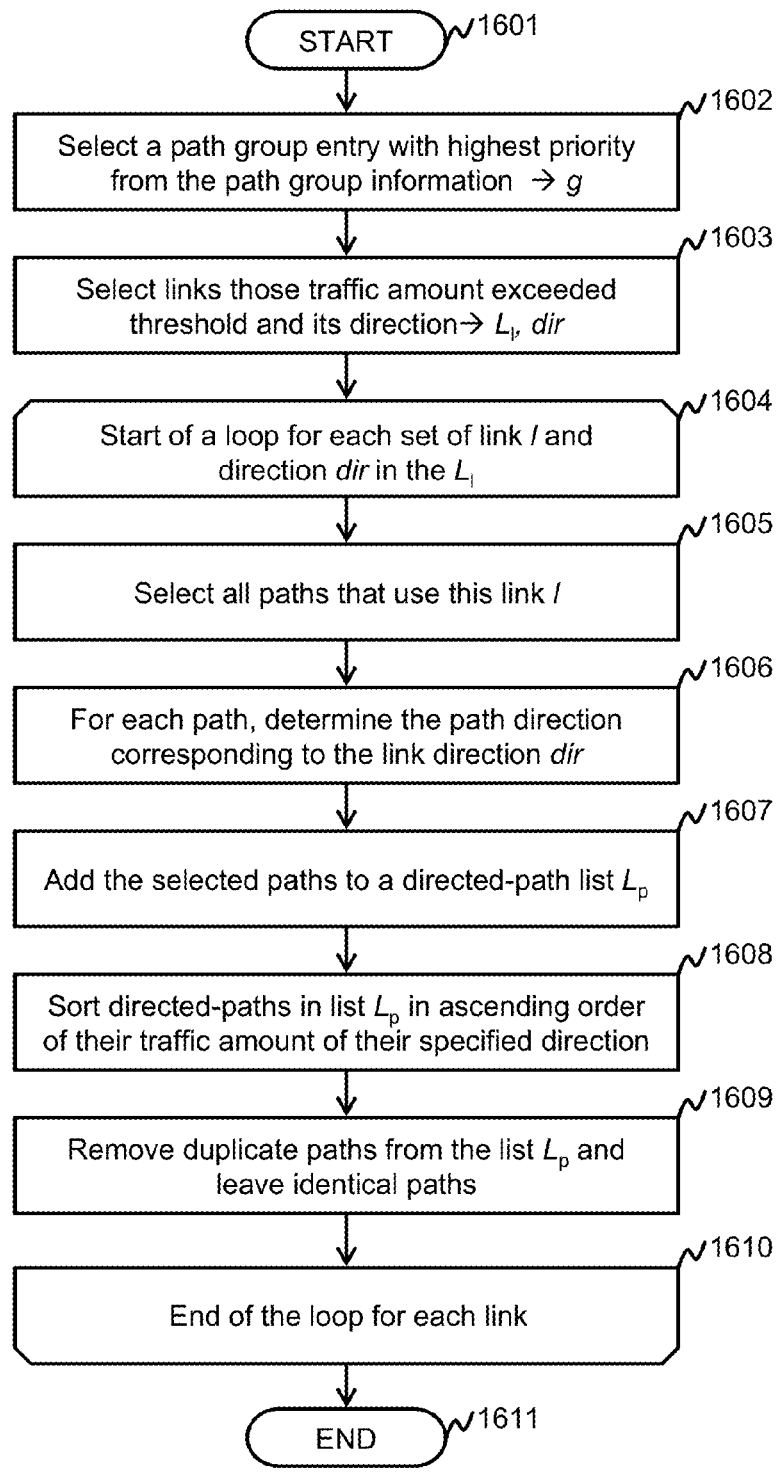
FIG. 16 shows an example of a flow diagram illustrating a procedure of the path-group tiering management program which represents the selection process of the candidate paths to be migrated from all paths in the network according to the first embodiment.

FIG. 16 shows an example of a flow diagram illustrating a procedure of the path-group tiering management program 407 which represents the selection process of the candidate paths to be migrated from all paths in the network according to the first embodiment. When it starts the process (step 1601), it selects a path-group entry g that has the highest priority in the path-group information (step 1602). Also, by using the link traffic performance information 417, it selects links whose traffic amounts exceed the threshold designated in the path-group information 414 and stores the links and their directions as a list $L_l$ (step 1603). The path-group tiering management program 407 starts a loop for each set of link l and direction dir in the list $L_l$ (step 1604). First, it selects all paths that use this link l (step 1605). For each of these selected paths, it determines the path direction corresponding to the link direction dir (step 1605). It then adds sets of a path ID of the path and the path direction for all of the selected paths to a list of directed paths $L_p$ (step 1606). It sorts entries in the directed-path list $L_p$ in ascending order of the amount of traffic corresponding to the above determined path direction (step 1607). Finally, it removes duplicate entries in the list of directed paths $L_p$ (step 1608). It repeats the loop until it processes all of the selected links in the list $L_l$ (step 1609), and the process ends (step 1610).

Figure 17:
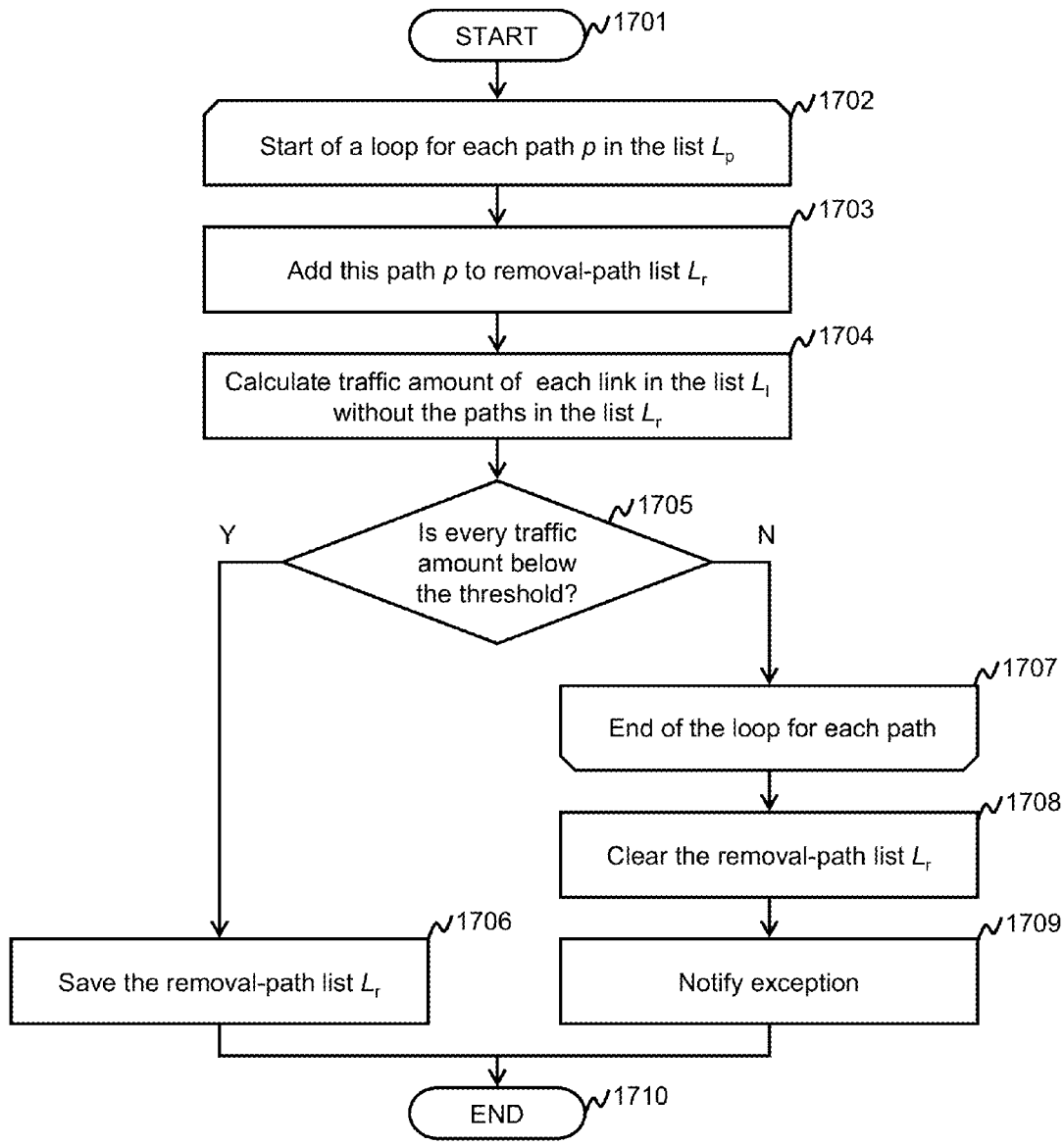
FIG. 17 shows an example of a flow diagram illustrating a procedure of the path-group tiering management program which represents a process of selection of paths that are to be removed from a higher-prioritized path-group according to the first embodiment.

FIG. 17 shows an example of a flow diagram illustrating a procedure of the path-group tiering management program 407 which represents a process of selection of paths that are to be removed from a higher-prioritized path-group according to the first embodiment. When it starts the process (step 1701), it starts a loop for each path p in the previously described list $L_p$, which is the list of candidate paths to be migrated (step 1702). In this loop, it adds the path p to a removal-path list $L_r$ which manages the paths to be removed from the higher-prioritized path-group (step 1703). Then it calculates the supposed amount of traffic of each link in the directed link list $L_l$ by subtracting path p's traffic amount for a direction that matches the direction of each entry of the list $L_l$ (step 1704). It then checks if all the supposed traffic amounts are below the threshold of the current path-group (step 1705). If the result is true, it terminates the loop for each path p and saves the removal-path list $L_r$ (step 1706). This removal-path list $L_r$ is later utilized by the path-group tiering management program 407 for actual configuration of storage devices and network switches. If the check result in step 1705 is false, it repeats the loop for each path p until all paths in the list $L_p$ are processed (step 1707). After the completion of the loop for each path p, it clears the removal-path list $L_r$ because there is no solution to cap the traffic amount within the threshold (step 1708). It notifies an exception message (step 1709). After saving the removal-path list in step 1706 or after the notification of exception in step 1709, the process ends (step 1710).

Figure 18:
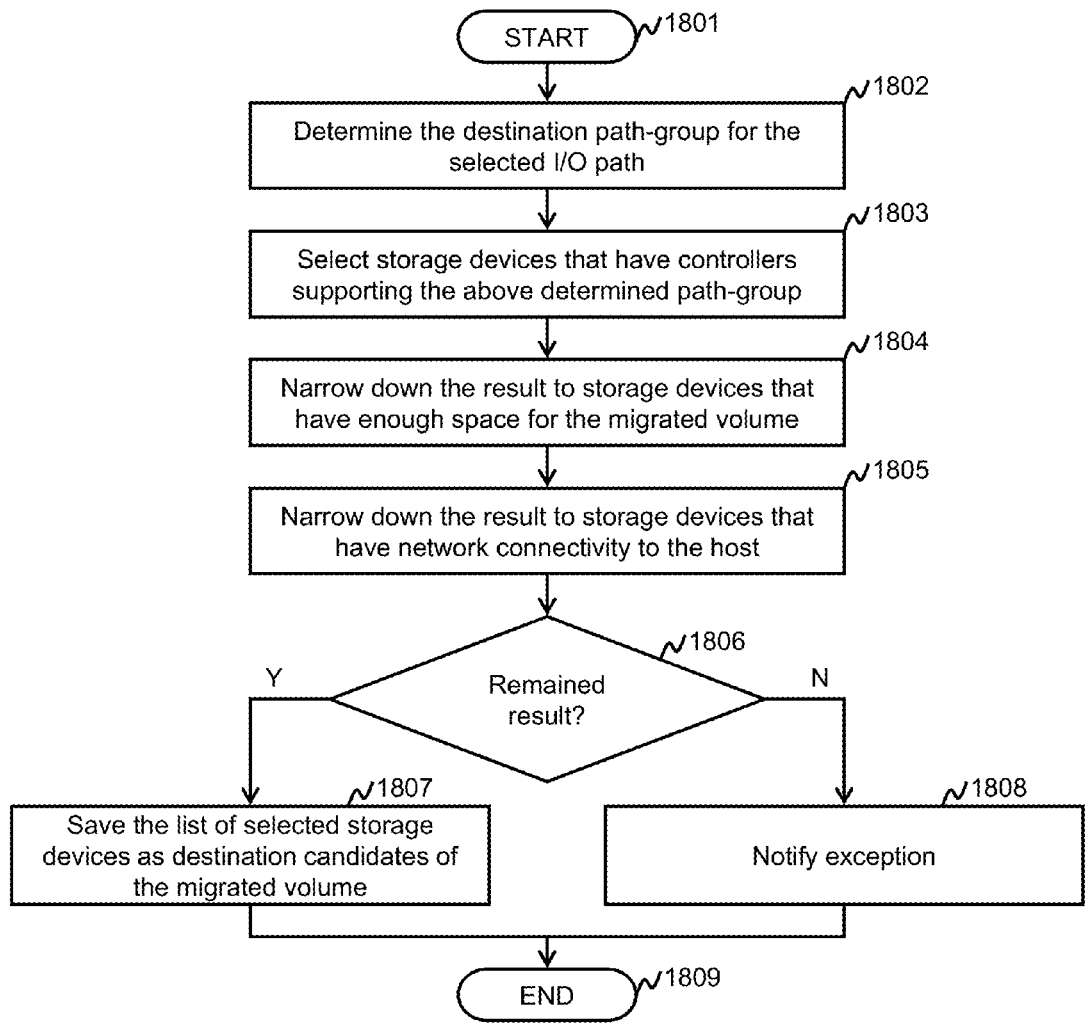
FIG. 18 shows an example of a flow diagram illustrating a procedure of the path-group tiering management information which represents a process of selection of candidate volumes for a lower-prioritized path group.

FIG. 18 shows an example of a flow diagram illustrating a procedure of the path-group tiering management information 407 which represents a process of selection of candidate volumes for a lower-prioritized path group. After starting the process (step 1801), the path-group tiering management program 407 determines, from the path-group information 414, to which path-group the paths in the previously described removal-path list $L_r$ are to be migrated (step 1802). In this example, the path-group iscsi0 is selected as the destination of the paths in the fc0 path-group because it has second priority in the path groups. It then selects storage devices that have controllers that support the above determined path-group's protocol type (step 1803). It also narrows down the result of selected storage devices by checking if the storage device in the result has sufficient amount of space for the volume corresponding to the designated path (step 1804). It further narrows down the result of selected storage devices by checking if the storage device in the result has network connectivity to the host of the designated path (step 1805). The path-group tiering management program 407 checks if there is at least one storage device that passes the above selection (step 1806). If its result is true, it saves the selected devices in a list as candidate destinations of the volumes corresponding to the paths in the removal-path list $L_r$ (step 1807). If not, it notifies an exception message (step 1808). The process ends at step 1809.

Figure 19:
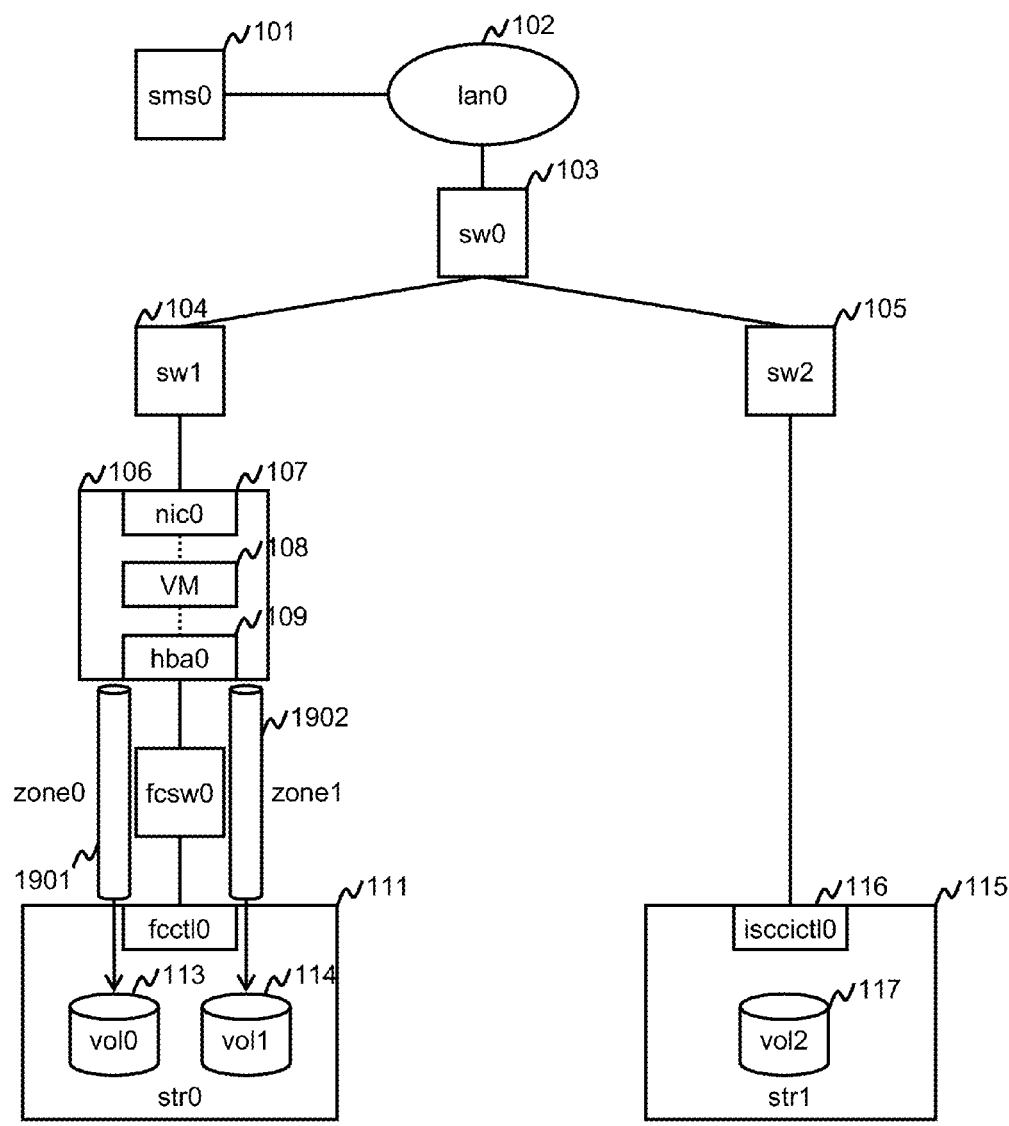
FIG. 19 shows another example of a network system before path migration according to the first embodiment of the present invention.

FIG. 19 shows another example of a network system according to the first embodiment of the present invention. It represents the status of paths before path migration. This means that there are two FC I/O paths that are configured by using two zone ("zone0" 1901 and "zone1" 1902) between the host 106 and the storage device 111.

Figure 20:
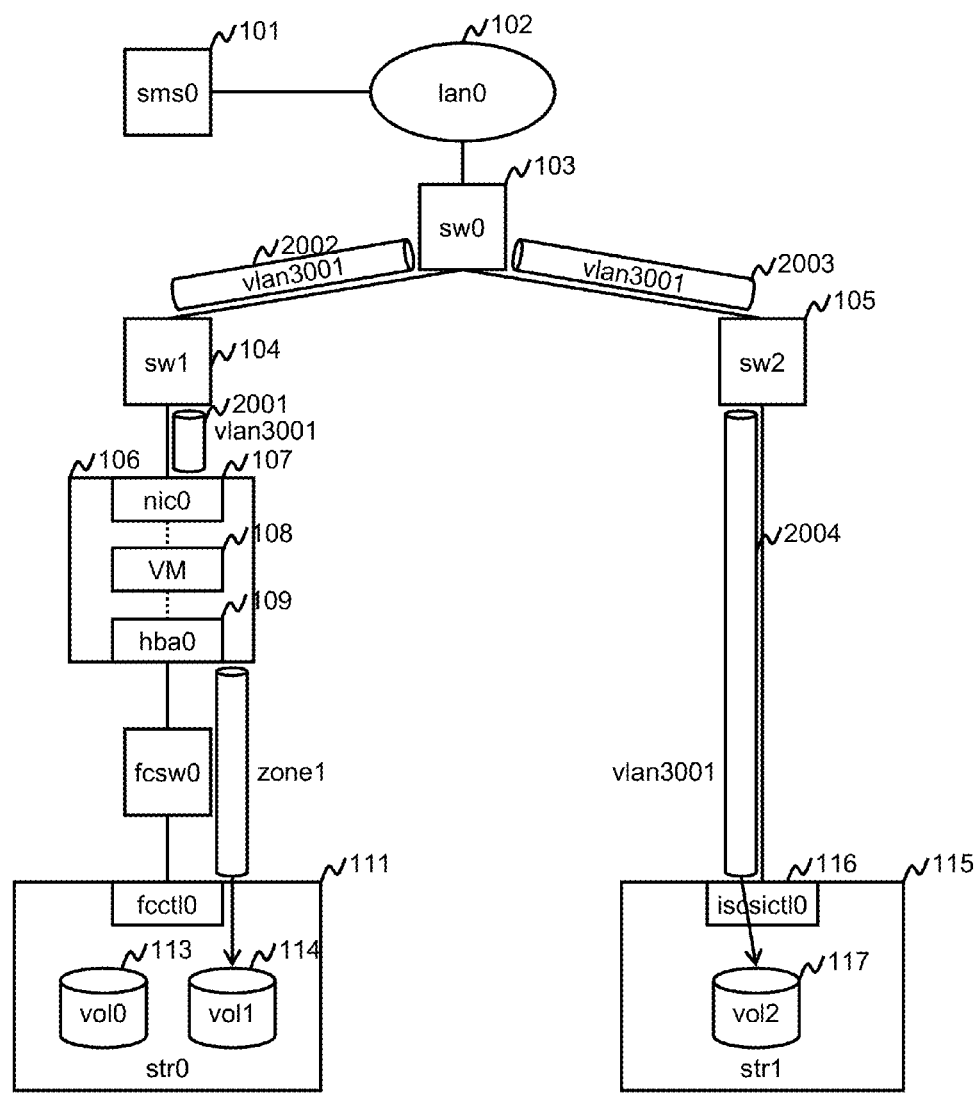
FIG. 20 shows another example of a network system after path migration according to the first embodiment of the present invention.

FIG. 20 shows another example of a network system according to the first embodiment of the present invention. It represents the status of paths after path migration. This means that there is a remained FC I/O path configured by using a zone "zone1". Also, as a result of path migration, there is an iSCSI path between the host 106 and the volume 117 on the iSCSI storage device 115. This iSCSI I/O path is configured by using the VLAN (vlan3001) on the layer-2 switches 103-105 (2001, 2002, 2003, and 2004), the NIC 107 of the host 106, and the iSCSI controller 116 of the storage device 115.

Second Embodiment

Figure 21:
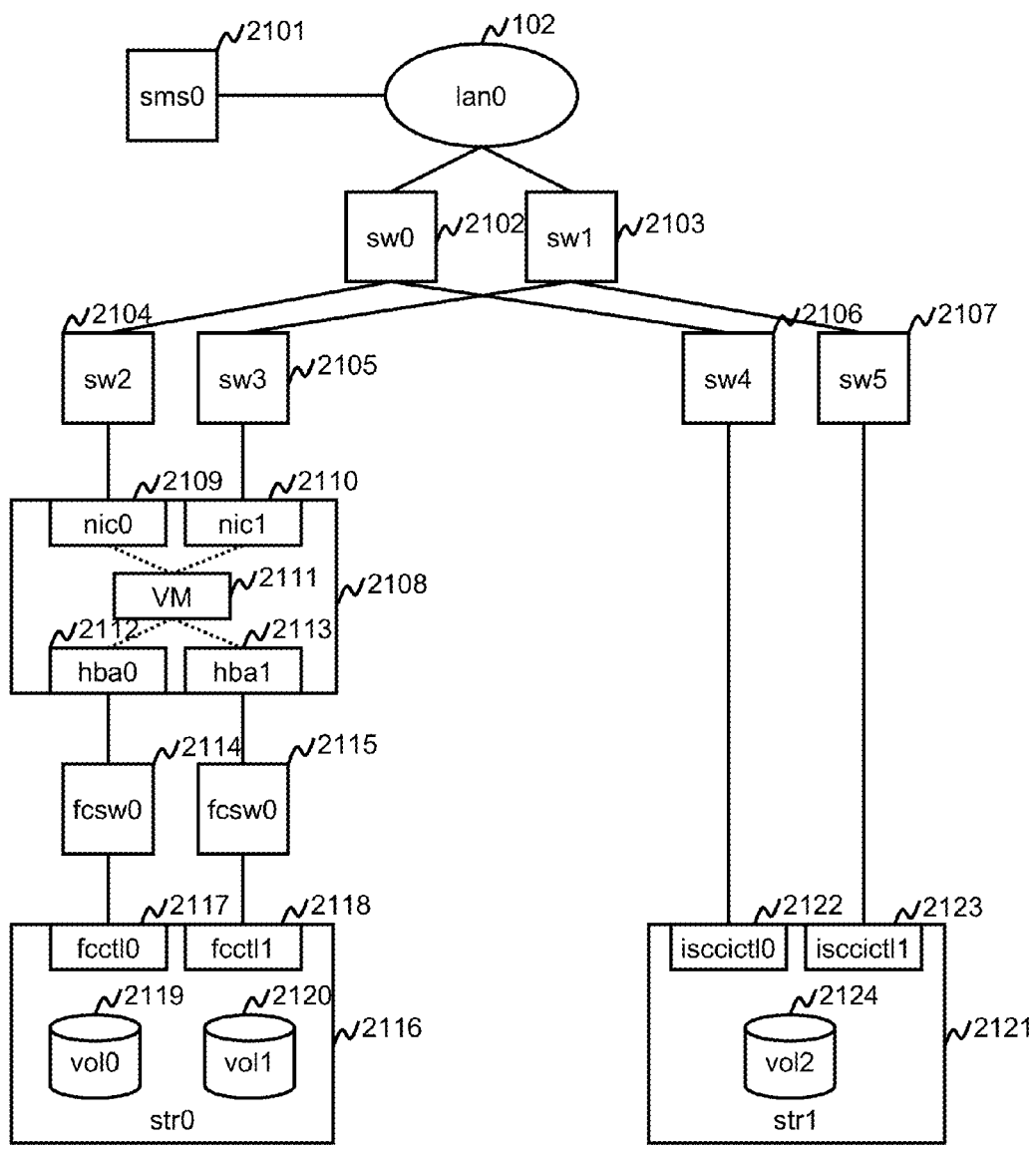
FIG. 21 shows an example of a network system according to a second embodiment of the present invention.

FIG. 21 shows an example of a network system according to a second embodiment of the present invention. In this example, multiple and redundant I/O paths can be configured for each of the volumes. The network system contains six layer-2 switches 2102-2107 (instead of three in FIG. 1) and two FC switches 2114 and 2115 (instead of one in FIG. 1).

The network includes a storage management system 2101, a Local Area Network (LAN) 102 connected with the storage management system 2101, six L2 switches 2012-2107 (the switch 2012 is connected with the LAN 102 and two other switches 2104 and 2106 and the switch 2013 is connected with the LAN 102 and two other switches 2105 and 2107), a host 2108 connected with the switches 2104 and 2105, two FC switches 2114, 2115 connected with the host 2108, an FC storage device 2116 connected with the two FC switches 2114, 2115, and an iSCSI storage device 2121 connected with the two switches 2106, 2107. The host 2108 includes two NICs 2109, 2110, a VM 2111, and two FC-HBAs 2112, 2113. The FC storage device 2116 includes two FC-capable controllers 2117, 2118 and volumes 2119, 2120. The iSCSI storage device 2121 includes two iSCSI-capable controllers 2122, 2123 and a volume 2124.

Figure 22:
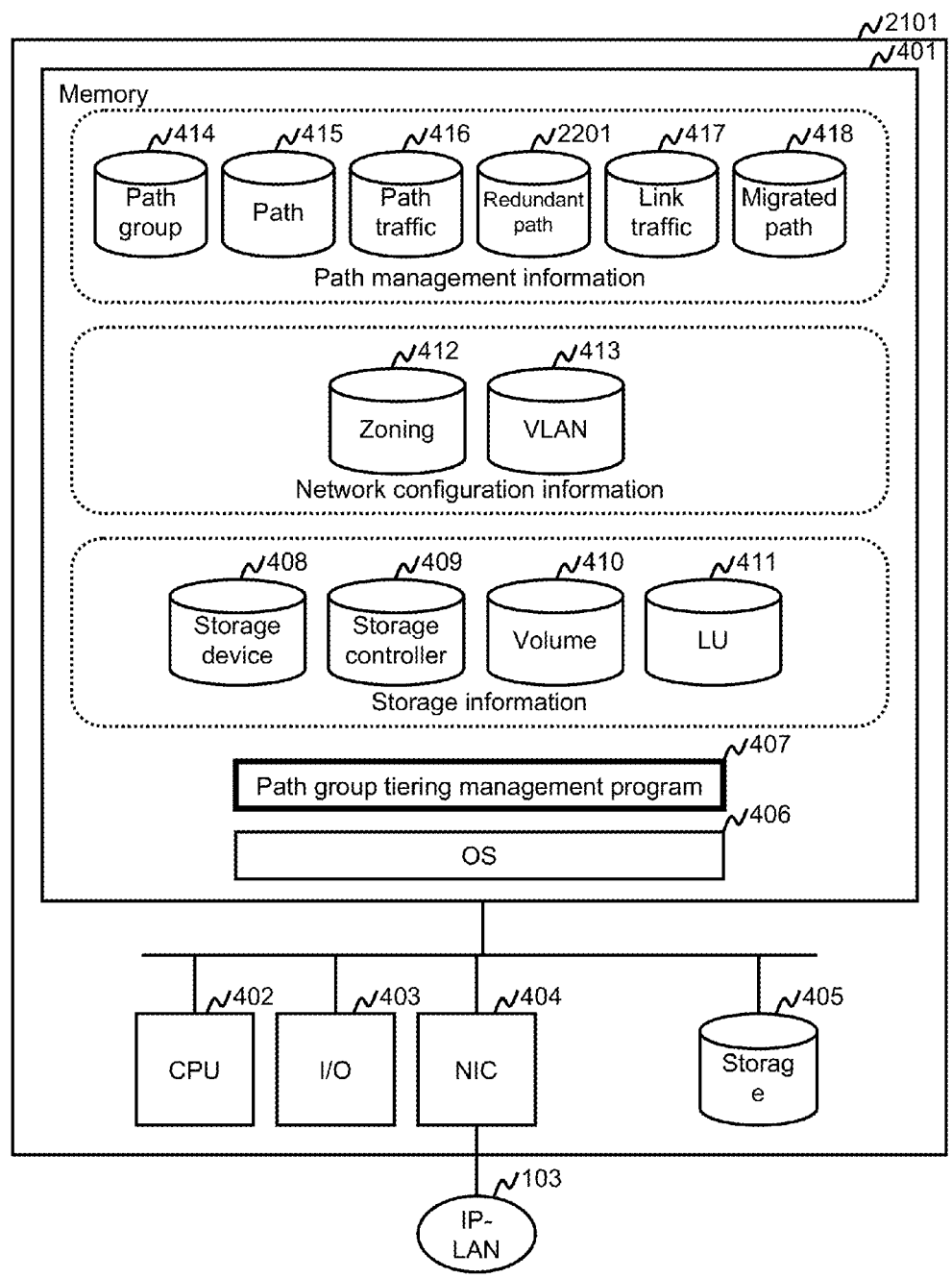
FIG. 22 shows an example of hardware architecture and software architecture of the storage management system according to the second embodiment of the present invention.

FIG. 22 shows an example of hardware architecture and software architecture of the storage management system 2101 according to the second embodiment of the present invention. Its architecture is the same as that of the storage management system 101 in the first embodiment except for the additional redundant path information 2201 stored on the memory 401.

FIG. 23 shows an example of the path information 415 according to the second embodiment. Before path migration in the network, it contains four entries 2301-2304 that represent two sets of two redundant FC I/O paths. Two paths named "path0" and "path1" form a set of redundant paths and provide the host 2108 with connectivity to the volume 2119 named "vol0" on the storage device 2116. Also, two paths named "path2" and "path3" form a set of redundant paths and provide the host 2108 with connectivity to the volume 2120 named "vol1" on the storage device 2116.

FIG. 24 shows an example of the redundant path information 2201. There are four rows/entries 2401-2404. Each entry represents a configuration of a redundant path for a path. In this example, a set of "path0" and "path1" and a set of "path2" and "path3" are configured as pairs of mutually redundant paths.

Figure 25:
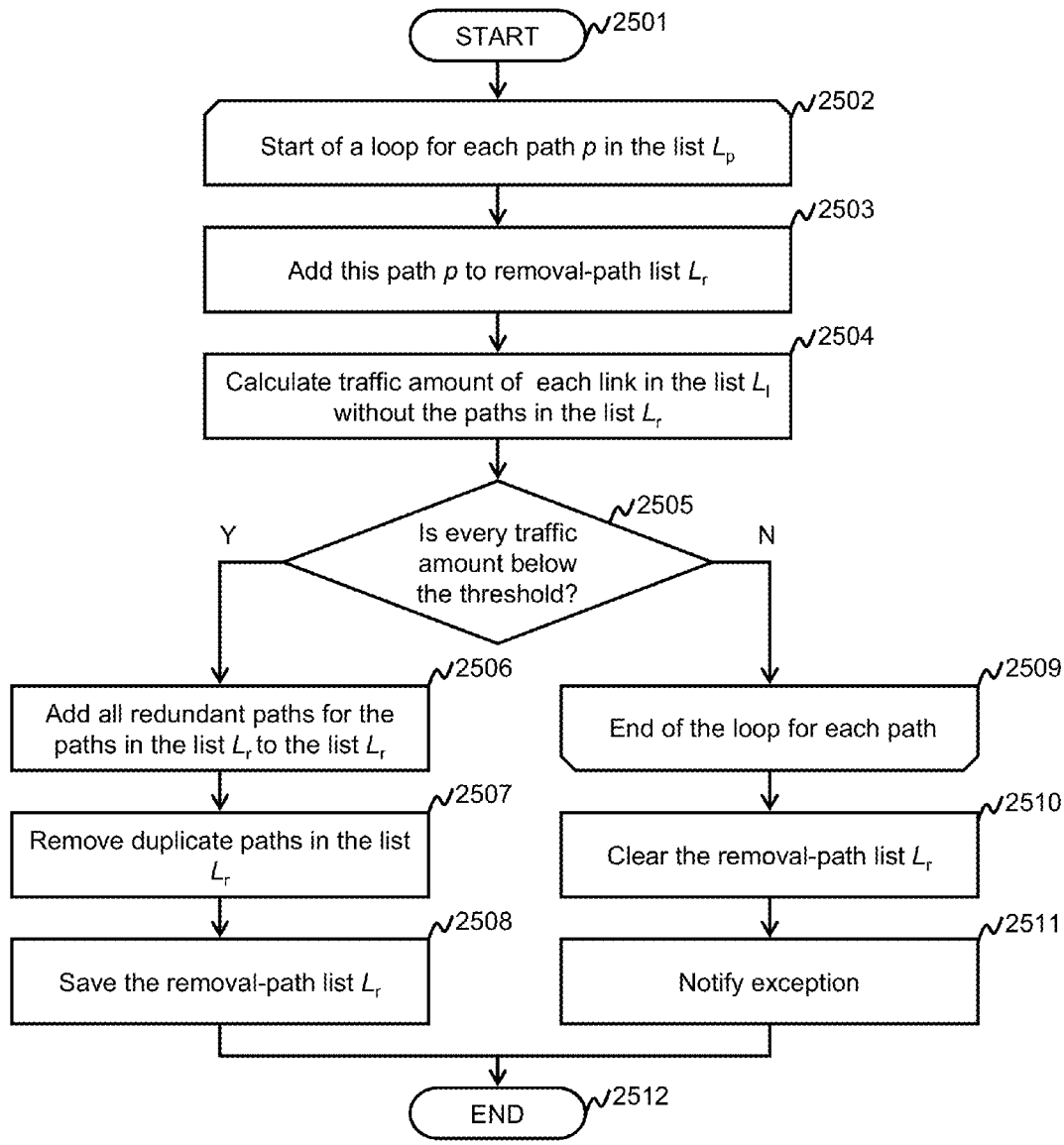
FIG. 25 shows an example of a flow diagram illustrating a procedure of the path-group tiering management program 407 which represents a process of selection of paths that are to be removed from a higher-prioritized path-group according to the second embodiment.

FIG. 25 shows an example of a flow diagram illustrating a procedure of the path-group tiering management program 407 which represents a process of selection of paths that are to be removed from a higher-prioritized path-group according to the second embodiment. This flow diagram is identical to the flow diagram of the first embodiment shown in FIG. 17 except for the additional steps 2506 and 2507 (steps 2501-2505 are identical to steps 1701-1705 and steps 2509-2512 are identical to steps 1707-1710). After the paths to be removed are determined and listed in the removal-path list $L_r$, the path-group tiering management program 407 checks if the paths in the list $L_r$ have their redundant paths, and if they have redundant paths, it adds the redundant paths to the list $L_r$ (step 2506). It removes any duplicate paths in the list $L_r$ (step 2507). These additional steps of the path-group tiering management program 407 are provided to migrate multiple paths forming a redundant path consistently and to prevent one side of the redundant paths from being left in the current path-group. The path-group tiering management program 407 manages the redundancy between multiple FC paths and the redundancy between multiple iSCSI paths, and preserves the redundancy after the migration of paths.

Third Embodiment

Figure 26:
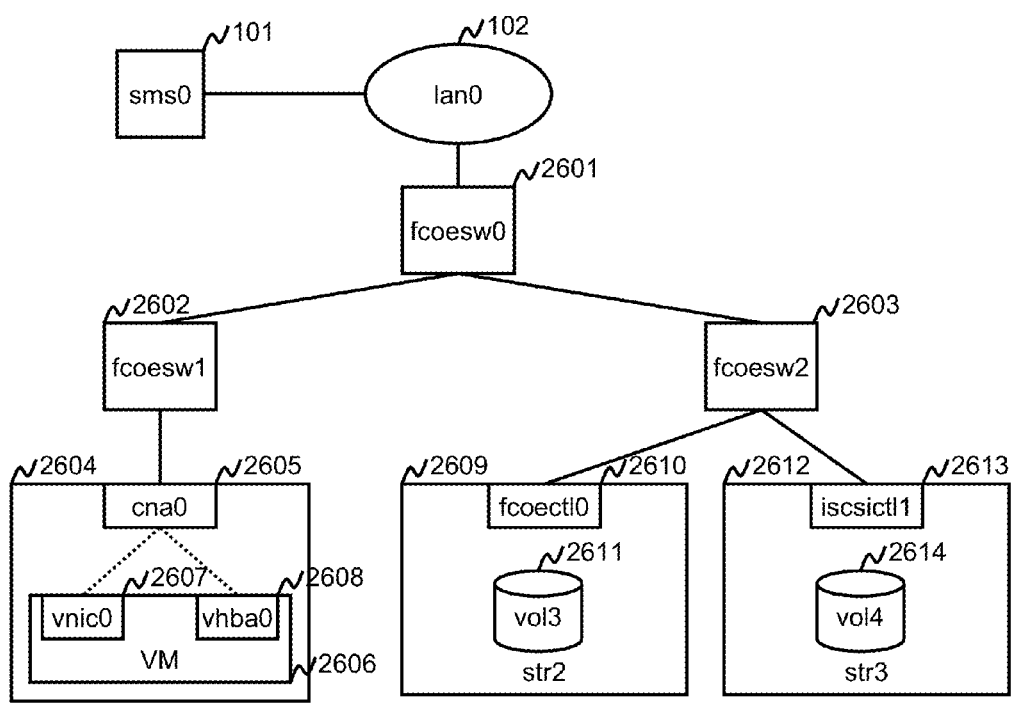
FIG. 26 shows an example of a network system according to a third embodiment of the present invention.

FIG. 26 shows an example of a network system according to a third embodiment of the present invention. The network system has a storage management system 101 and a LAN 102 connected with the storage management system 101. It includes three FCoE switches 2601-2603, and a host 2604 equipped with a Converged Network Adaptor (CNA) 2605. The CNA 2605 is configured to provide a VM 2606 with a virtual NIC (vNIC) 2607 and virtual HBA (vHBA) 2608. Two storage devices 2609 and 2612 are an FCoE-capable storage and an iSCSI-capable storage, respectively. The FCoE-capable storage 2609 has an FCoE-capable controller 2610 and a volume 2611. The iSCSI-capable storage 2612 has an iSCSI-capable controller 2613 and a volume 2614. I/O paths between the host 2604 and the storage 2609 or 2612 are multiplexed on an FCoE network composed of the FCoE switches 2601-2603.

Figure 27:
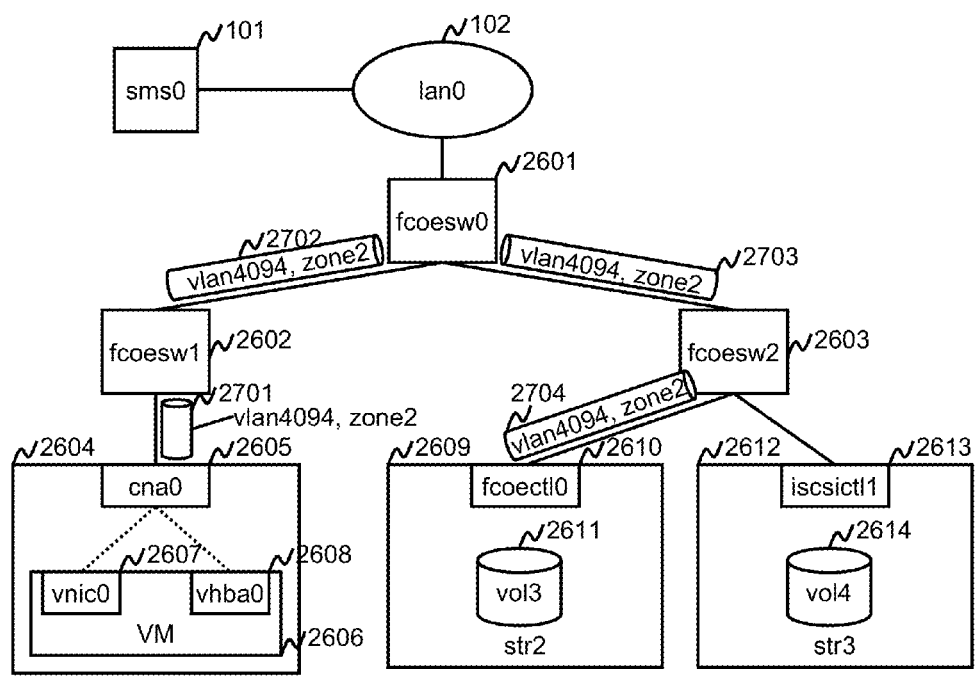
FIG. 27 shows an example of the initial state of the I/O path between the host and the FCoE-capable storage.

FIG. 27 shows an example of the initial state of the I/O path between the host 2604 and the FCoE-capable storage 2609. It is an FCoE I/O path and conveys FC-protocol data on Converged Enhanced Ethernet (CEE) links along the FCoE path. The FCoE path is isolated from LAN traffic by a dedicatedly allocated VLAN. In this example, VLAN 4094 is allocated for the FCoE path. Further, an I/O path is isolated by a zoning configuration. In this example, "zone2" is configured for the I/O path between a host 2604 and the FCoE-capable storage 2609. The FCoE I/O path is shown as 2701, 2702, 2703, 2704.

Figure 28:
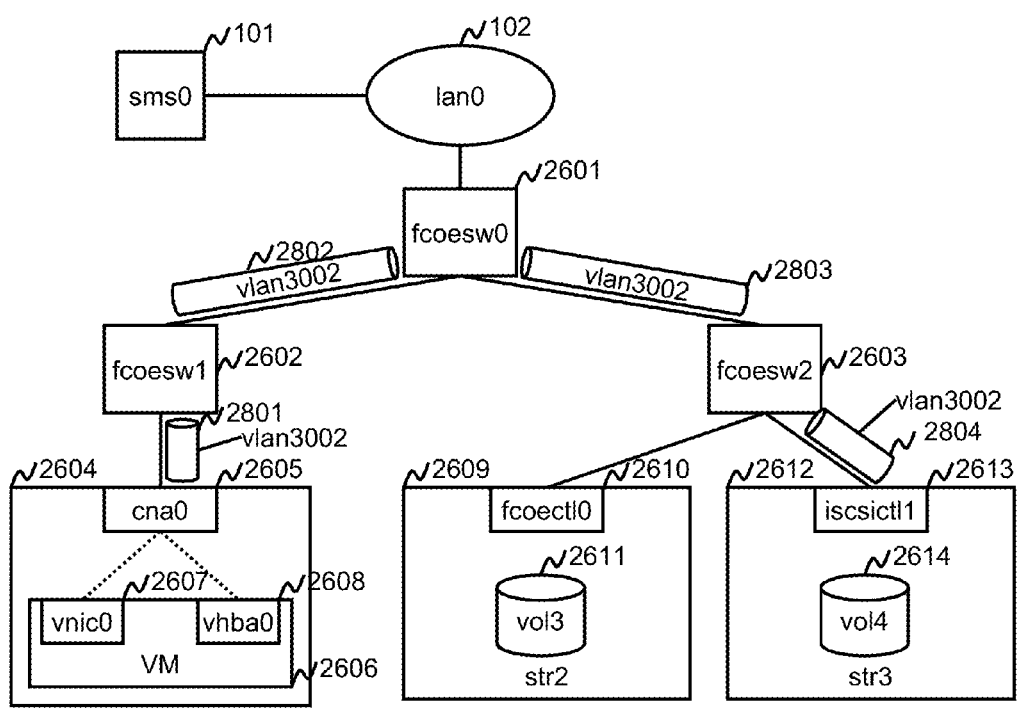
FIG. 28 shows an example of the post-migration state of the I/O path between the host and the iSCSI-capable storage.

FIG. 28 shows an example of the post-migration state of the I/O path between the host 2604 and the iSCSI-capable storage 2612. It is an iSCSI path and conveys iSCSI-protocol data along a TCP/IP path. The I/O path is isolated from other LAN traffic by a VLAN. In this example, VLAN 3002 is allocated for the iSCSI path. The iSCSI path is shown as 2801, 2802, 2803, 2804.

Figure 29:
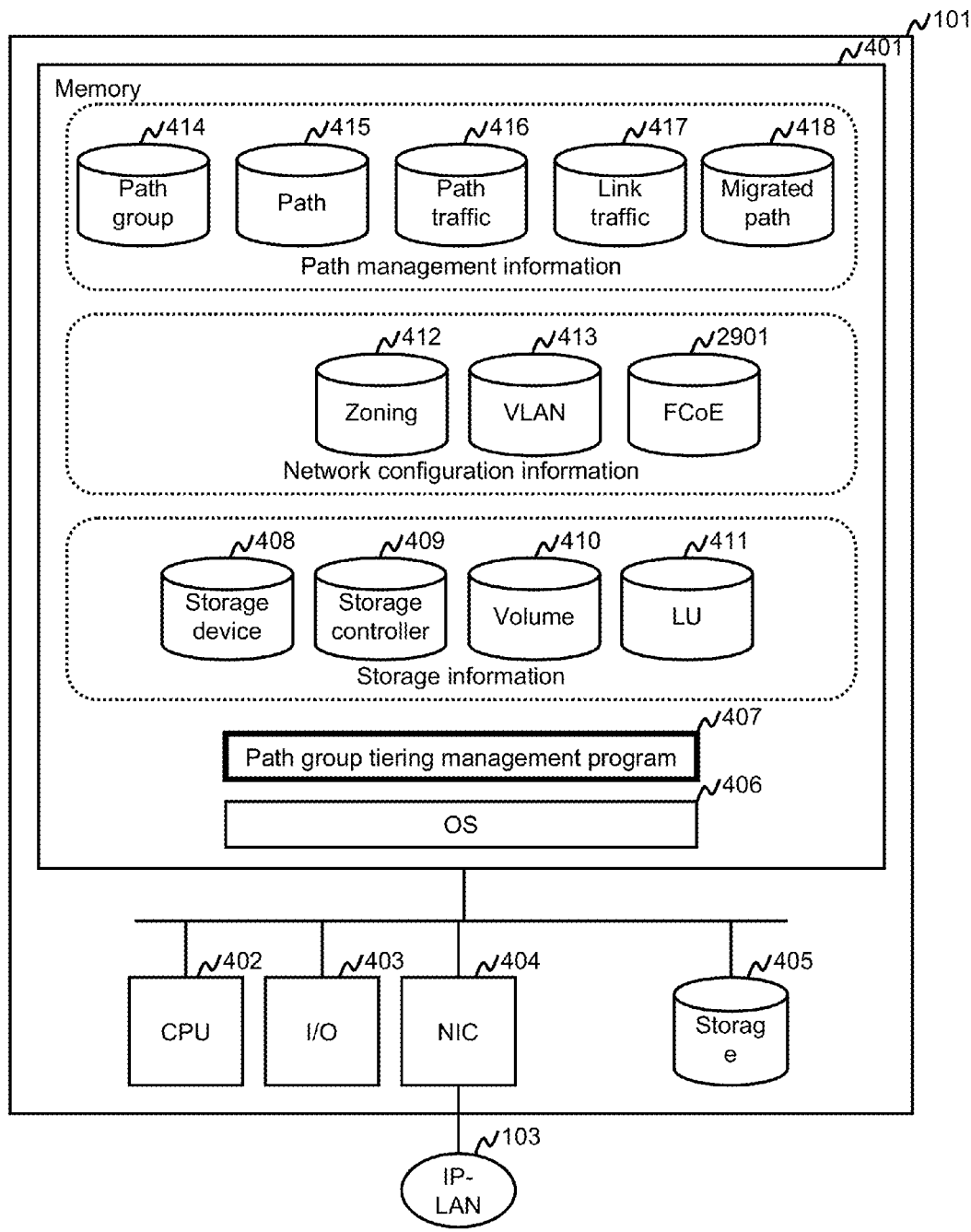
FIG. 29 shows an example of hardware architecture and software architecture of the storage management system according to the third embodiment of the present invention.

FIG. 29 shows an example of hardware architecture and software architecture of the storage management system 101 according to the third embodiment of the present invention. Its architecture is the same as that of the storage management system 101 in the first embodiment except for the additional FCoE network configuration information 2901 stored on the memory 401. The FCoE network configuration information 2901 stores data relating to the configuration that shows how links of the FCoE switches in the network allocate their bandwidth to different types of traffics. This information is used by the path-group tiering management program 407 to calculate bandwidth allocated for an FCoE path and bandwidth allocated for iSCSI paths multiplexed on a link.

FIG. 30 shows an example of the FCoE network configuration information 2901. FIG. 30 shows rows/entries 3001-3006. Each entry represents a configuration of a preference group of an FCoE switch. The entry is a set of a switch ID, a preference group ID, bandwidth ratio, and description about the application. In this example, all switches fcoesw0, fcoesw1, and fcoesw2 are configured to allocate 40% of link bandwidth to SAN applications and the remaining 60% to LAN applications.

Figure 31:
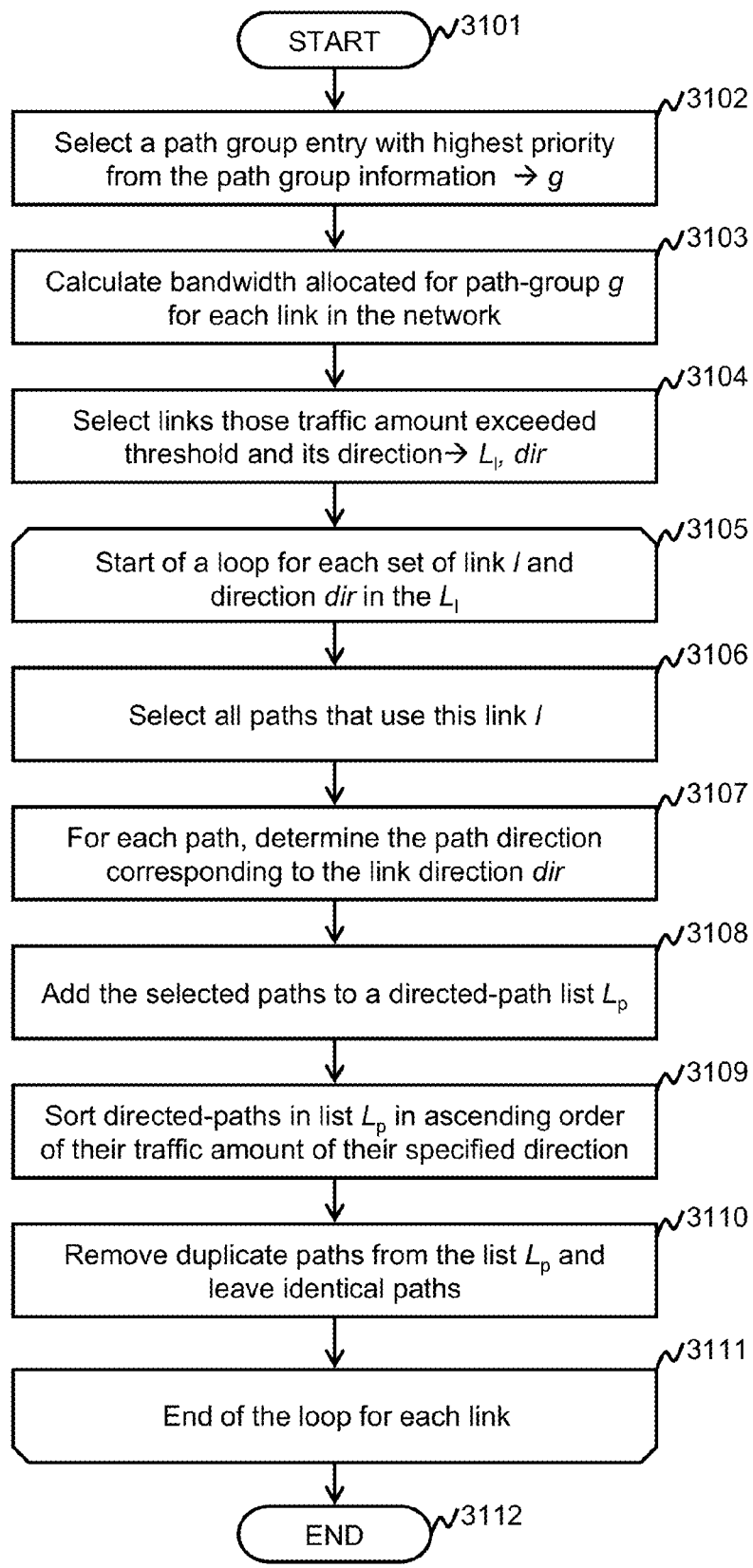
FIG. 31 shows an example of a flow diagram illustrating a procedure of the path-group tiering management program which represents the selection process of the candidate paths to be migrated from all paths in the network according to the third embodiment.

FIG. 31 shows an example of a flow diagram illustrating a procedure of the path-group tiering management program 407 which represents the selection process of the candidate paths to be migrated from all paths in the network according to the third embodiment. The difference between the flow diagrams of FIG. 31 and FIG. 16 (first embodiment) is that the path-group tiering management program 407 takes into account the bandwidth isolated to an FCoE path and iSCSI paths on the same link in FIG. 31. For this reason, in step 3103 (steps 3101 and 3102 are identical to steps 1601 and 1602), the path-group tiering management program 407 calculates bandwidth allocated for the path-group g selected in step 3102. In detail, it refers to the FCoE network configuration information 2901 and retrieves the bandwidth ratio regarding the protocol of the path-group g. From the bandwidth ratio and a link bandwidth of physical links, the path-group tiering management program 407 calculates the allocated bandwidth.

Step 3104 is identical to step 1603. Steps 3105-3108 are slightly different from steps 1604-1606. In step 3105, the program starts a loop for each set of link l and direction dir in the list $L_l$. In step 3106, it selects all paths that use this link l. For each of these selected paths, it determines the path direction corresponding to the link direction dir (step 3107). It then adds path IDs of the selected paths to a list of directed paths $L_p$ (step 3108). Steps 3109-3112 are identical to steps 1607-1610.

Figure 32:
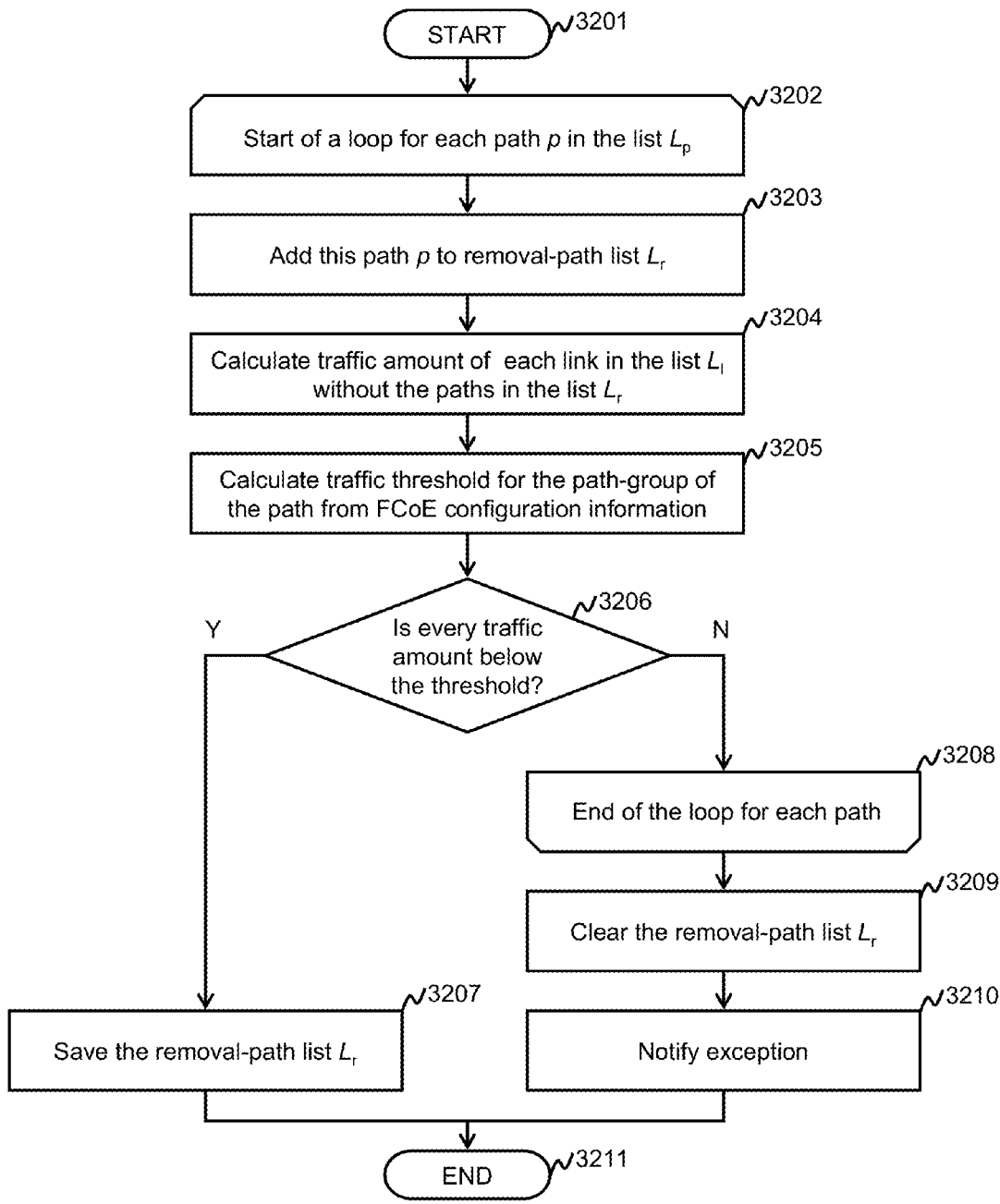
FIG. 32 shows an example of a flow diagram illustrating a procedure of the path-group tiering management program which represents a process of selection of paths that are to be removed from a higher-prioritized path-group according to the third embodiment.

FIG. 32 shows an example of a flow diagram illustrating a procedure of the path-group tiering management program 407 which represents a process of selection of paths that are to be removed from a higher-prioritized path-group according to the third embodiment. In this example, it means that FCoE paths would be migrated to iSCSI paths. This flow diagram is identical to the flow diagram of the first embodiment shown in FIG. 17 except for the additional step 3205 (steps 3201-3204 are identical to steps 1701-1704 and steps 3206-2511 are identical to steps 1705-1710). The difference is that the path-group tiering management program 407 of the third embodiment takes into account the bandwidth isolated to an FCoE path and iSCSI paths on the same link. For this reason, in step 3205, the path-group tiering management program 407 calculates traffic threshold for the path-group of the path being processed from the FCoE network configuration information 2901 and link bandwidth of physical links. The threshold of each link is calculated by multiplying the bandwidth of the physical link, the bandwidth ratio described in the FCoE network configuration information 2901, and the threshold ratio described in the path-group information 414.

Fourth Embodiment

Figure 33:
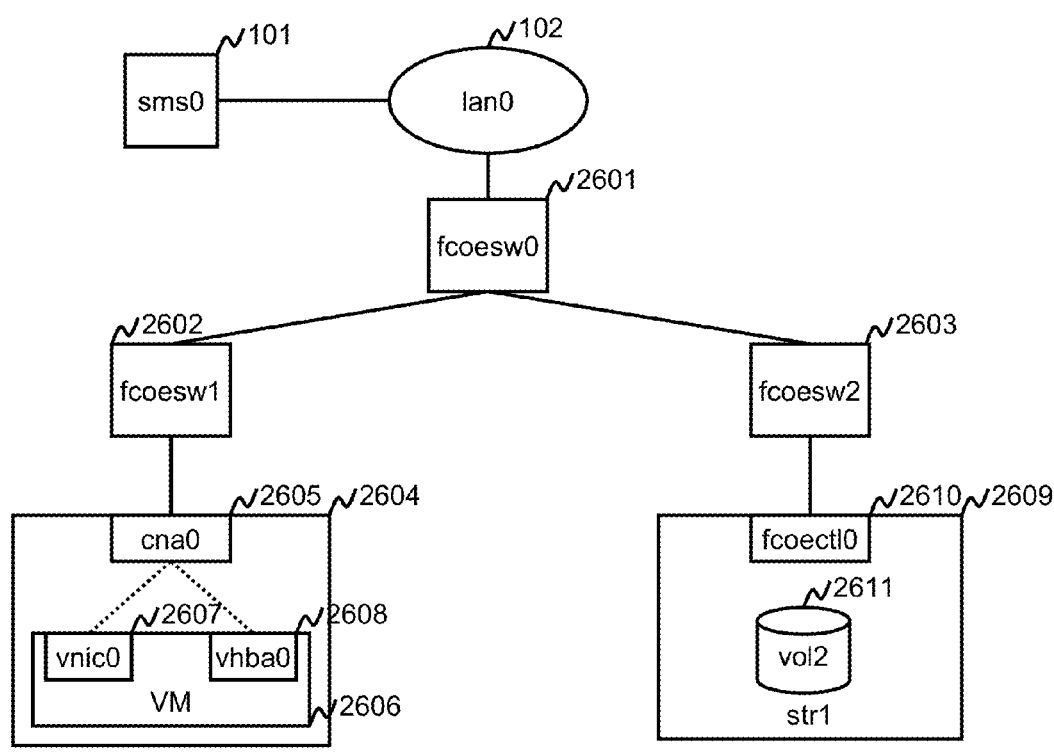
FIG. 33 shows an example of a network system according to a fourth embodiment of the present invention.

FIG. 33 shows an example of a network system according to a fourth embodiment of the present invention. The network system has a storage management system 101 and a LAN 102 connected with the storage management system 101. It includes three FCoE switches 2601-2603, and a host 2604 equipped with the Converged Network Adaptor (CNA) 2605. The CNA 2605 is configured to provide a VM 2606 with a virtual NIC (vNIC) 2607 and virtual HBA (vHBA) 2608. I/O paths between the host 2604 and the storage device 2609 are multiplexed on the FCoE network composed of the FCoE switches 2601-2603. An FCoE-capable storage 2609 has an FCoE-capable controller 2610 and a volume 2611. In this example, the path-group tiering management program 407 of the storage management system 101 manages two types of path-groups, FCoE I/O paths and iSCSI I/O paths, both of which are deployed on the FCoE network.

Figure 34:
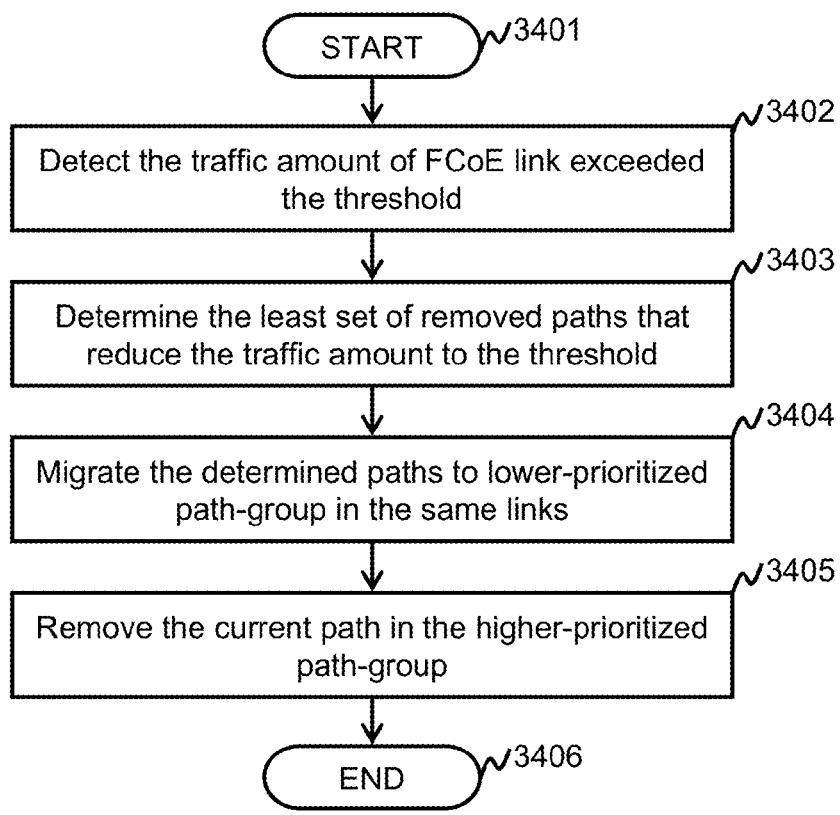
FIG. 34 shows an example of a flow diagram illustrating a procedure of path migration according to the fourth embodiment.

FIG. 34 shows an example of a flow diagram illustrating a procedure of path migration according to the fourth embodiment. To manage the multiplexed I/O paths, the path-group tiering management program 407 manages the bandwidth allocated to each of the FCoE paths and iSCSI paths. When the path-group tiering management program 407 detects that the traffic amount of FCoE paths exceeds the threshold of an FCoE link (step 3402) after starting the process (step 3401), it determines the least set of FCoE paths to suppress the amount of FCoE traffic below the threshold for FCoE traffic (step 3403). Same as the first embodiment and the second embodiment, the FCoE paths are selected in ascending order of their traffic amounts. Then it migrates the FCoE paths to the iSCSI path-group without changing the used links (step 3404). Finally, it removes the migrated FCoE path from the FCoE path-group (step 3405). The process ends at step 3406.

Of course, the system configurations illustrated in FIGS. 1, 21, 27, and 33 are purely exemplary of information systems in which the present invention may be implemented, and the invention is not limited to a particular hardware configuration. The computers and storage systems implementing the invention can also have known I/O devices (e.g., CD and DVD drives, floppy disk drives, hard drives, etc.) which can store and read the modules, programs and data structures used to implement the above-described invention. These modules, programs and data structures can be encoded on such computer-readable media. For example, the data structures of the invention can be stored on computer-readable media independently of one or more computer-readable media on which reside the programs used in the invention. The components of the system can be interconnected by any form or medium of digital data communication, e.g., a communication network. Examples of communication networks include local area networks, wide area networks, e.g., the Internet, wireless networks, storage area networks, and the like.

In the description, numerous details are set forth for purposes of explanation in order to provide a thorough understanding of the present invention. However, it will be apparent to one skilled in the art that not all of these specific details are required in order to practice the present invention. It is also noted that the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged.

As is known in the art, the operations described above can be performed by hardware, software, or some combination of software and hardware. Various aspects of embodiments of the invention may be implemented using circuits and logic devices (hardware), while other aspects may be implemented using instructions stored on a machine-readable medium (software), which if executed by a processor, would cause the processor to perform a method to carry out embodiments of the invention. Furthermore, some embodiments of the invention may be performed solely in hardware, whereas other embodiments may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

From the foregoing, it will be apparent that the invention provides methods, apparatuses and programs stored on computer readable media for migrating existing data among multiple SAN storage devices. Additionally, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the terms used in the following claims should not be construed to limit the invention to the specific embodiments disclosed in the specification. Rather, the scope of the invention is to be determined entirely by the following claims, which are to be construed in accordance with the established doctrines of claim 1nterpretation, along with the full range of equivalents to which such claims are entitled.

What is claimed is:

1. A computer comprising:
a memory; and
a processor being operable to manage a plurality of path groups, each of which includes a plurality of logical paths associated with a host computer, wherein each logical path of the plurality of logical paths connects the host computer to a logical volume of one or more logical volumes in one or more storage systems;
wherein the processor is operable to manage a priority of each path group of the plurality of path groups, and to use a logical path of a first path group instead of a logical path of a second path group for I/O (input/output) usage between the host computer and the one or more storage systems, representing a migration of I/O usage from the second path group to the first path group, based on at least the priorities of the first and second path groups;
wherein each path group has a present threshold; and
wherein the processor is operable, when a traffic amount of one path group exceeds the preset threshold for the one path group, to migrate I/O usage from one or more logical paths in the path group to one or more logical paths in another path group, which has a lower priority than the one path group and which has a traffic amount that does not exceed the preset threshold for said another path group.

2. The computer according to claim 1,
wherein the processor is operable to migrate I/O usage between two path groups of the plurality of path groups, based on information of usage of at least one logical path in each of the two path groups, priorities of the two path groups, and performance of at least one logical path in each of the two path groups.

3. The computer according to claim 1,
wherein the logical paths in any one path group are of a same type on a path group basis.

4. The computer according to claim 1,
wherein the second path group has only Fibre Channel (FC) logical paths and the first path group has only Internet Small Computer System Interface (iSCSI) logical paths.

5. The computer according to claim 4,
wherein the second path group has only Fibre Channel (FC) logical paths with redundancy and the first path group has only Internet Small Computer System Interface (iSCSI) logical paths with redundancy; and
wherein the processor is operable, after the migration of I/O usage from the second path group to the first path group, to preserve redundancy of the iSCSI logical paths in the first path group and to preserve redundancy of the FC logical paths in the second path group.

6. The computer according to claim 1,
wherein the second path group has only Fibre Channel over Ethernet (FCoE) logical paths in an FCoE network and the first path group has only Internet Small Computer System Interface (iSCSI) logical paths in the same FCoE network.

7. The computer according to claim 6,
wherein I/O logical paths, including the FCoE logical paths and the iSCSI logical paths, between the host computer and an FCoE storage system are multiplexed on the FCoE network having FCoE switches, along a set of FCoE links from the host computer via the FCoE switches to the FCoE storage system; and
wherein the migration of I/O usage from the second path group to the first path group does not change the set of FCoE links from the host computer via the FCoE switches to the FCoE storage system used for the I/O logical paths.

8. A system comprising:
one or more storage systems; and
a computer including a memory and a processor;
wherein the processor is operable to manage a plurality of path groups, each of which includes a plurality of logical paths associated with a host computer, wherein each logical path of the plurality of logical paths connects the host computer to a logical volume of one or more logical volumes in the one or more storage systems;
wherein the processor is operable to manage a priority of each path group of the plurality of path groups, and to use a logical path of a first path group instead of a logical path of a second path group for I/O (input/output) usage between the host computer and the one or more storage systems, representing a migration of I/O usage from the second path group to the first path group, based on at least the priorities of the first and second path groups;
wherein each path group has a present threshold; and wherein the processor is operable, when a traffic amount of one path group exceeds the preset threshold for the one path group, to migate I/O usage from one or more logical paths in the path group to one or more logical paths in another path group, which has a lower priority than the one path group and which has a traffic amount that does not exceed the preset threshold for said another path group.

9. The system according to claim 8, wherein the one or more storage systems include a Fibre Channel (FC) storage system and an Internet Small Computer System Interface (iSCSI) storage system, the system further comprising:
   the host computer;
   at least one FC switch coupled between the host computer and the FC storage system;
   a local area network (LAN) coupled to the computer; and
   a plurality of Layer 2 (L2) switches coupled between the LAN, the host computer, and the iSCSI storage system to configure a Virtual LAN (VLAN);
   wherein the second path group has only FC logical paths between the host computer and the FC storage system and the first path group has only iSCSI logical paths between the host computer and the iSCSI storage system; and
   wherein the processor is operable to migrate a volume, which is associated with the migration of I/O usage from the second path group to the first path group, from the FC storage system to the iSCSI storage system.

10. The system according to claim 8, wherein the one or more storage systems include a Fibre Channel over Ethernet (FCoE) storage system and an Internet Small Computer System Interface (iSCSI) storage system, the system further comprising:
   the host computer;
   a local area network (LAN) coupled to the computer; and
   a plurality of FCoE switches coupled between the LAN, the host computer, the FCoE storage system and the iSCSI storage system to provide an FCoE network;
   wherein the second path group has only FCoE logical paths between the host computer and the FCoE storage system and the first path group has only iSCSI logical paths between the host computer and the iSCSI storage system, the FCoE logical paths and the iSCSI logical paths being multiplexed on the FCoE network; and
   wherein the processor is operable to migrate a volume, which is associated with the migration of I/O usage from the second path group to the first path group, from the FCoE storage system to the iSCSI storage system.

11. The system according to claim 8, wherein the one or more storage systems include a Fibre Channel over Ethernet (FCoE) storage system, the system further comprising:
   the host computer;
   a local area network (LAN) coupled to the computer; and
   a plurality of FCoE switches coupled between the LAN, the host computer, and the FCoE storage system to provide an FCoE network;
   wherein the second path group has only FCoE logical paths between the host computer and the FCoE storage system and the first path group has only iSCSI logical paths between the host computer and the FCoE storage system, the FCoE logical paths and the iSCSI logical paths being multiplexed on the FCoE network along a set of FCoE links from the host computer via the FCoE switches to the FCoE storage system; and
   wherein the migration of I/O usage from the second path group to the first path group does not change the set of FCoE links from the host computer via the FCoE switches to the FCoE storage system used for the FCoE and iSCSI logical paths.

12. A computer-readable storage medium storing a plurality of instructions for controlling a data processor to manage I/O (input/output) usage, the plurality of instructions comprising:
   instructions that cause the data processor to manage a plurality of path groups, each of which includes a plurality of logical paths associated with a host computer, wherein each logical path of the plurality of logical paths connects the host computer to a logical volume of one or more logical volumes in one or more storage systems;
   instructions that cause the data processor to manage a priority of each path group of the plurality of path groups;
   instructions that cause the data processor to use a logical path of a first path group instead of a logical path of a second path group for I/O usage between the host computer and the one or more storage systems, representing a migration of I/O usage from the second path group to the first path group, based on at least the priorities of the first and second path groups, wherein each path group has a preset threshold; and
   instructions that cause the data processor, when a traffic amount of one path group exceeds the preset threshold for the one path group, to migrate I/O usage from one or more logical paths in the one path group to one or more logical paths in another path group, which has a lower priority than the one path group and which has a traffic amount that does not exceed the preset threshold for said another path group.

13. The computer-readable storage medium according to claim 12, wherein the plurality of instructions further comprise:
   instructions that cause the data processor to migrate I/O usage between two path groups of the plurality of path groups, based on information of usage of at least one logical path in each of the two path groups, priorities of the two path groups, and performance of at least one logical path in each of the two path groups.

14. The computer-readable storage medium according to claim 12,
   wherein the logical paths in any one path group are of a same type on a path group basis.

15. The computer-readable storage medium according to claim 12,
   wherein the one or more storage systems include a Fibre Channel (FC) storage system and an Internet Small Computer System Interface (iSCSI) storage system;
   wherein the second path group has only FC logical paths between the host computer and the FC storage system and the first path group has only iSCSI logical paths between the host computer and the iSCSI storage system; and
   wherein the plurality of instructions further comprise instructions that cause the data processor to migrate a volume, which is associated with the migration of I/O usage from the second path group to the first path group, from the FC storage system to the iSCSI storage system.

16. The computer-readable storage medium according to claim 15,
   wherein the second path group has only Fibre Channel (FC) logical paths with redundancy and the first path group has only Internet Small Computer System Interface (iSCSI) logical paths with redundancy; and wherein the plurality of instructions further comprise instructions that cause the data processor, after the migration of I/O usage from the second path group to the first path group, to preserve redundancy of the iSCSI logical paths in the first path group and to preserve redundancy of the FC logical paths in the second path group.

17. The computer-readable storage medium according to claim 12,
wherein the one or more storage systems include a Fibre Channel over Ethernet (FCoE) storage system and an Internet Small Computer System Interface (iSCSI) storage system;
wherein the second path group has only FCoE logical paths between the host computer and the FCoE storage system and the first path group has only iSCSI logical paths between the host computer and the iSCSI storage system, the FCoE logical paths and the iSCSI logical paths being multiplexed on an FCoE network; and
wherein the plurality of instructions further comprise instructions that cause the data processor to migrate a volume, which is associated with the migration of I/O usage from the second path group to the first path group, from the FCoE storage system to the iSCSI storage system.

18. The computer-readable storage medium according to claim 12,
wherein the one or more storage systems include a Fibre Channel over Ethernet (FCoE) storage system;
wherein the second path group has only FCoE logical paths between the host computer and the FCoE storage system and the first path group has only iSCSI logical paths between the host computer and the FCoE storage system, the FCoE logical paths and the iSCSI logical paths being multiplexed on the FCoE network along a set of FCoE links from the host computer via the FCoE network to the FCoE storage system; and
wherein the migration of I/O usage from the second path group to the first path group does not change the set of FCoE links from the host computer via the FCoE network to the FCoE storage system used for the FCoE and iSCSI logical paths.

19. The system according to claim 8,
wherein the processor is operable to migrate I/O usage between two path groups of the plurality of path groups, based on information of usage of at least one logical path in each of the two path groups, priorities of the two path groups, and performance of at least one logical path in each of the two path groups.

20. The system according to claim 8,
wherein the logical paths in any one path group are of a same type on a path group basis.

* * * * *